United States Patent
Meng et al.

(10) Patent No.: US 12,288,422 B2
(45) Date of Patent: Apr. 29, 2025

(54) LIVING BODY DETECTION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Jia Meng, Shenzhen (CN); Xinyao Wang, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 475 days.

(21) Appl. No.: 17/585,205

(22) Filed: Jan. 26, 2022

(65) Prior Publication Data

US 2022/0148337 A1 May 12, 2022

Related U.S. Application Data

(63) Continuation of application No. PCT/CN2020/124290, filed on Oct. 28, 2020.

(30) Foreign Application Priority Data

Jan. 17, 2020 (CN) .......................... 202010054359.2

(51) Int. Cl.
  *G06V 40/40* (2022.01)
  *G06V 10/60* (2022.01)
  (Continued)

(52) U.S. Cl.
  CPC .............. *G06V 40/45* (2022.01); *G06V 10/60* (2022.01); *G06V 20/46* (2022.01); *G06V 40/161* (2022.01);
  (Continued)

(58) Field of Classification Search
  CPC ...... G06V 40/40; G06V 40/45; G06V 40/165; G06V 40/168; G06V 40/16; G06V 10/60;
  (Continued)

(56) References Cited

U.S. PATENT DOCUMENTS 10,546,183 B2 * 1/2020 Rodriguez ............. G06V 40/45
10,796,178 B2 * 10/2020 Fan ....................... G06V 10/141
(Continued)

FOREIGN PATENT DOCUMENTS

CN        105184246        12/2015
CN        106529512         3/2017
(Continued)

OTHER PUBLICATIONS

PCT International Search Report and Written Opinion issued in Application PCT/CN2020/124290 on Feb. 1, 2021, 14 pages.

*Primary Examiner* — Andrew M Moyer
*Assistant Examiner* — Ahmed A Nasher
(74) *Attorney, Agent, or Firm* — ArentFox Schiff LLP

(57) ABSTRACT

A method of living body detection includes generating a detection interface in response to a receipt of a living body detection request for a verification of a detection object. The detection interface includes a first region with a viewing target for the detection object to track, a position of the first region in the detection interface changes during a detection time according to a first sequence of a position change of the first region. The method also includes receiving a video stream that is captured during the detection time, determining a second sequence of a sight line change of the detection object based on the video stream, and determining that the detection object is a living body at least partially based on the second sequence of the sight line change of the detection object matching the first sequence of the position change of the first region.

15 Claims, 9 Drawing Sheets

(51) Int. Cl.
   *G06V 20/40* (2022.01)
   *G06V 40/16* (2022.01)
   *G06V 40/18* (2022.01)
   *G06V 40/60* (2022.01)
(52) U.S. Cl.
   CPC .......... *G06V 40/171* (2022.01); *G06V 40/193* (2022.01); *G06V 40/67* (2022.01)
(58) Field of Classification Search
   CPC .. G06V 10/141; G06V 40/172; G06V 40/197; G06V 20/48; G06T 2207/30201
   See application file for complete search history.

(56) References Cited

U.S. PATENT DOCUMENTS

| | | | |
|---|---|---|---|
| 2018/0096212 A1* | 4/2018 | Lin | G06V 40/172 |
| 2020/0178876 A1* | 6/2020 | Lam | A61B 5/4803 |
| 2024/0134050 A1* | 4/2024 | Keilaf | G01S 17/42 |
| 2024/0280703 A1* | 8/2024 | Petilli | G01S 17/10 |

FOREIGN PATENT DOCUMENTS

| | | |
|---|---|---|
| CN | 107992794 | 5/2018 |
| CN | 110135370 | 8/2019 |
| CN | 111274928 | 6/2020 |

\* cited by examiner

| A1 | A2 | A3 |
|----|----|----|
| B4 | B5 | B6 |
| C7 | C8 | C9 |

| A1 | B1 | C1 | D1 |
|----|----|----|----|
| A2 | B2 | C2 | D2 |
| A3 | B3 | C3 | D3 |
| A4 | B4 | C4 | D4 |
| A5 | B5 | C5 | D5 |
| A6 | B6 | C6 | D6 |
FIG. 9
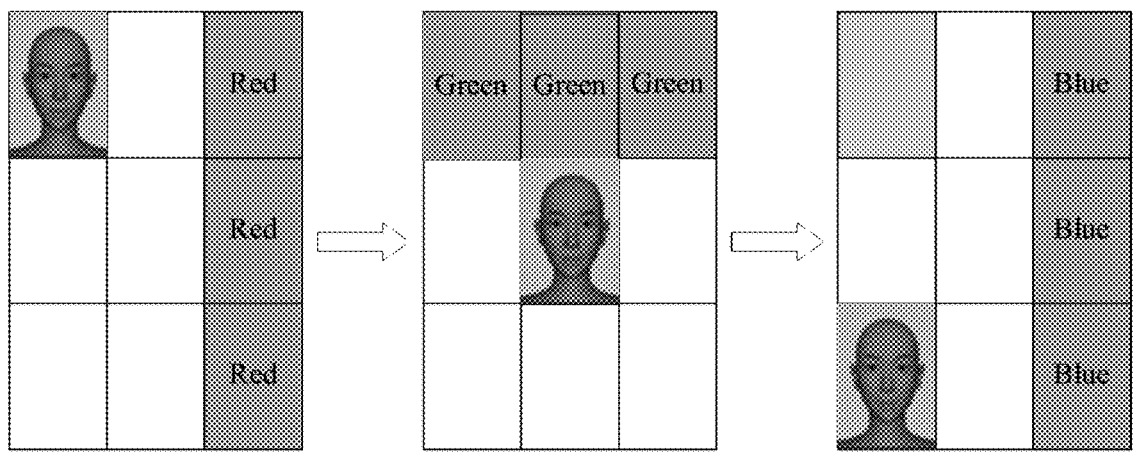
FIG. 10
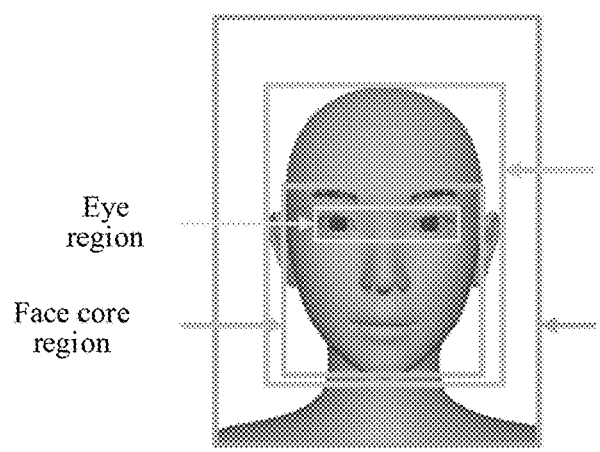
FIG. 11

LIVING BODY DETECTION METHOD AND APPARATUS, ELECTRONIC DEVICE, AND STORAGE MEDIUM

RELATED APPLICATIONS

This application is a continuation of International Application No. PCT/CN2020/124290, entitled "LIVING BODY DETECTION METHOD AND APPARATUS, ELECTRONIC DEVICE, AND STORAGE MEDIUM" and filed on Oct. 28, 2020, which claims priority to Chinese Patent Application No. 202010054359.2, entitled "LIVING BODY DETECTION METHOD AND APPARATUS, ELECTRONIC DEVICE, AND STORAGE MEDIUM" filed on Jan. 17, 2020. The entire disclosures of the prior applications are hereby incorporated by reference in their entirety.

FIELD OF THE TECHNOLOGY

This disclosure relates to the field of communications technologies including a living body detection method and apparatus, an electronic device, and a storage medium.

BACKGROUND OF THE DISCLOSURE

In recent years, with the development of face recognition technology, the application of face recognition technology in various identity authentication systems is becoming more popular. For an identity authentication system based on face recognition, two problems generally need to be resolved: one is face verification and the other is living body detection. Living body detection is mainly used for determining whether a captured face image and other data is from a user, rather than playback or a forged material.

For attack means on living body detection, such as photograph attack or video playback attack, the related art proposes a living body detection solution based on the principle of reflection. That is, a mobile phone screen emits different colors of light to illuminate a face, then face features are analyzed based on changes in face pictures before and after a light-changing point, and then based on this, it is determined whether a detection object is a living body.

The foregoing living body detection solution, however, is not effective in resisting video injection attacks (such as, hacking a camera and directly transmitting an imaged reflective light attack sequence to a back end), making living body detection invalid, which can greatly affect accuracy and security of identity authentication.

SUMMARY

According to various embodiments provided in this disclosure, a living body detection method and apparatus, an electronic device, and a non-transitory computer-readable storage medium are provided.

Some aspects of the disclosure provide a method of living body detection. The method includes generating a detection interface in response to a receipt of a living body detection request for a verification of a detection object. The detection interface includes a first region with a viewing target for the detection object to track, a position of the first region in the detection interface changes during a detection time according to a first sequence of a position change of the first region. The method also includes receiving a video stream that is captured during the detection time, determining a second sequence of a sight line change of the detection object based on the video stream, and determining that the detection object is a living body at least partially based on the second sequence of the sight line change of the detection object matching the first sequence of the position change of the first region.

Some aspects of the disclosure provide an apparatus including processing circuitry. In some examples, the processing circuitry generates a detection interface in response to a receipt of a living body detection request for a verification of a detection object. The detection interface includes a first region with a viewing target for the detection object to track, a position of the first region in the detection interface changes during a detection time according to a first sequence of a position change of the first region. The processing circuitry receives a video stream that is captured during the detection time, determines a second sequence of a sight line change of the detection object based on the video stream, and determines that the detection object is a living body at least partially based on the second sequence of the sight line change of the detection object matching the first sequence of the position change of the first region.

Some aspects of the disclosure provide a non-transitory computer-readable medium storing instructions which when executed by a computer cause the computer to perform the method of living body detection.

An embodiment of this disclosure further provides an electronic device, including a memory and one or more processors; the memory storing computer readable instructions, and the one or more processors being configured to run the computer readable instructions in the memory to perform the steps in the living body detection method provided in the embodiments of this disclosure.

An embodiment of this disclosure further provides one or more non-transitory computer readable storage mediums, the one or more computer readable storage mediums storing computer readable instructions, and the computer readable instructions being loadable by one or more processors to perform the steps in the living body detection method according to the embodiments of this disclosure.

Details of one or more embodiments of this disclosure are provided in the accompany drawings and descriptions below. Based on the specification, the accompanying drawings, and the claims of this disclosure, other features, objectives, and advantages of this disclosure in some examples can be shown.

BRIEF DESCRIPTION OF THE DRAWINGS

To describe the technical solutions in the embodiments of this disclosure more clearly, the following briefly describes accompanying drawings required for describing the embodiments. The accompanying drawings in the following description show some embodiments of this disclosure.

FIG. 9 is still another example diagram of an initial interface according to an embodiment of this disclosure.

FIG. 10 is another example diagram of changes in a portrait region and a light emission region in a living body detection method according to an embodiment of this disclosure.

FIG. 11 is an example diagram of image capture in a living body detection method according to an embodiment of this disclosure.

DESCRIPTION OF EMBODIMENTS

The technical solutions in the embodiments of this disclosure are described in the following with reference to the accompanying drawings in the embodiments of this disclosure. The described embodiments are some the embodiments of this disclosure.

The embodiments of this disclosure provide a living body detection method and apparatus, an electronic device, and a storage medium. The living body detection apparatus may be integrated into a terminal, or may be integrated into a detection system including a terminal and a server.

Figure 1:
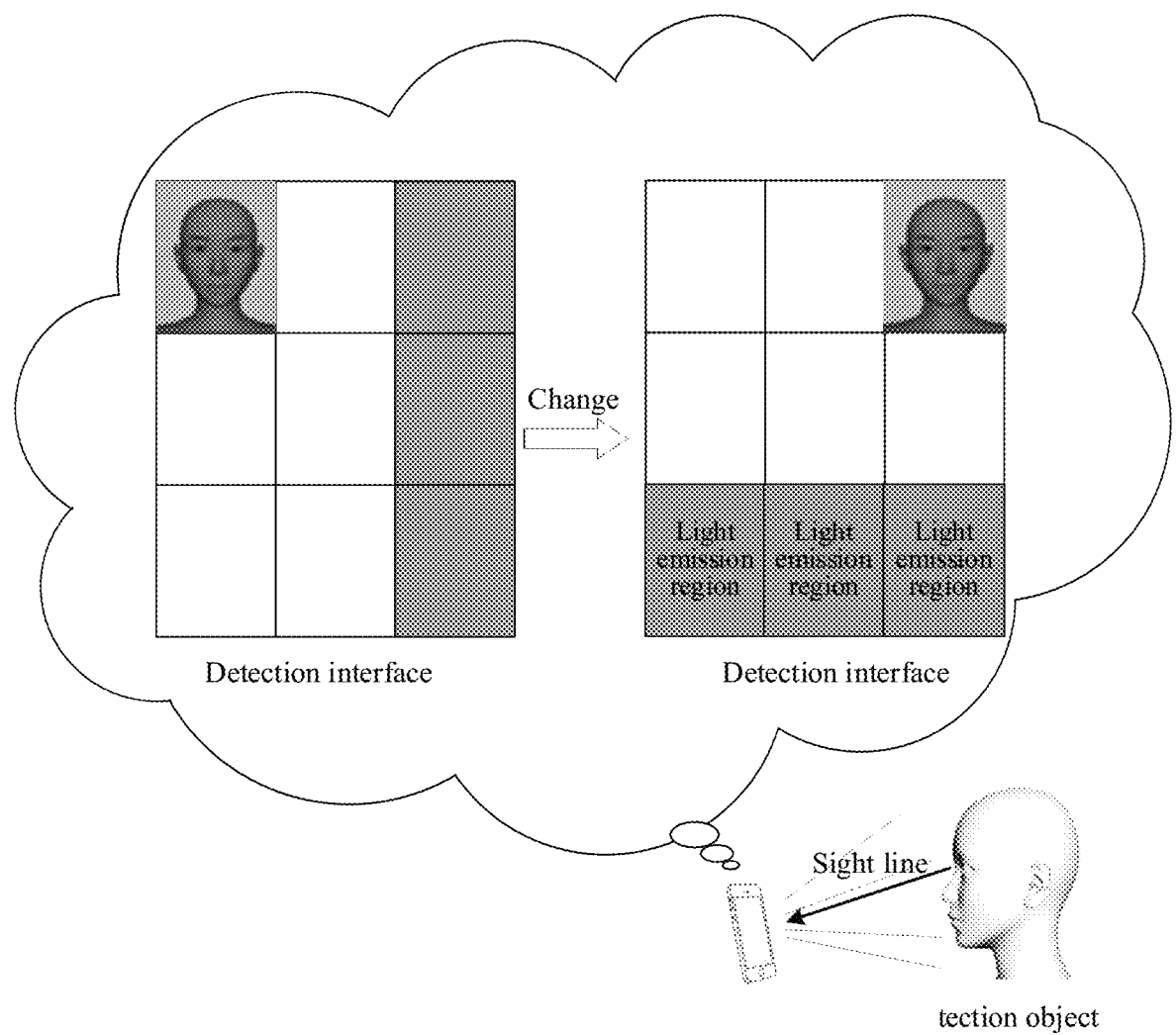
FIG. 1 is a schematic diagram of a scenario of a living body detection method according to an embodiment of this disclosure.

For example, the apparatus is integrated into a terminal. In this case, as shown in FIG. 1, the terminal may generate a detection interface in response to receipt of a living body detection request. The detection interface includes a portrait region and a light emission region, and a location of the portrait region and a location of the light emission region randomly change over time. Subsequently, light emitted from the light emission region may be used as a light source and projected onto a detection object, so that a surface of the detection object, such as a face, generates reflected light. Then, image features formed by the reflected light on the surface of the detection object are analyzed (because the light emission region changes, a region of the reflected light on the surface of the detection object also changes), and a sight line of the detection object gazing at the portrait region is tracked (because the location of the portrait region changes over time, the sight line also changes over time), to determine whether the detection object is a living body. For example, if it is determined, based on the image features, that a change in the reflected light matches a location change of the light emission region and sight line information obtained through tracking matches a location change of the portrait region, it is determined that the detection object is a living body; otherwise, the detection object is a non-living body.

The following separately provides detailed descriptions, and it should be noted that, sequence numbers of the following embodiments are not used as limitations to the exemplary sequence of the embodiments.

This embodiment is to be described from the perspective of a living body detection apparatus (briefly referred to as a living body detection apparatus) of a terminal. The living body detection apparatus may be specifically integrated into the terminal, such as a mobile phone, a tablet computer, a notebook computer, a personal computer (PC), or other electronic devices, or may be integrated into a detection system including the terminal and a server.

A living body detection method includes: generating a detection interface in response to receipt of a living body detection request, the detection interface including a portrait region and a light emission region, and a location of the portrait region and a location of the light emission region randomly changing over time; then projecting light to a detection object through the light emission region, and generating reflected light on a surface of the detection object; then acquiring image features formed by the reflected light on the surface of the detection object, and tracking a sight line of the detection object gazing at the portrait region; and determining that the detection object is a living body when it is determined, based on the image features, that a change in the reflected light matches a location change of the light emission region and sight line information obtained through tracking matches a location change of the portrait region.

Figures 2, 3:
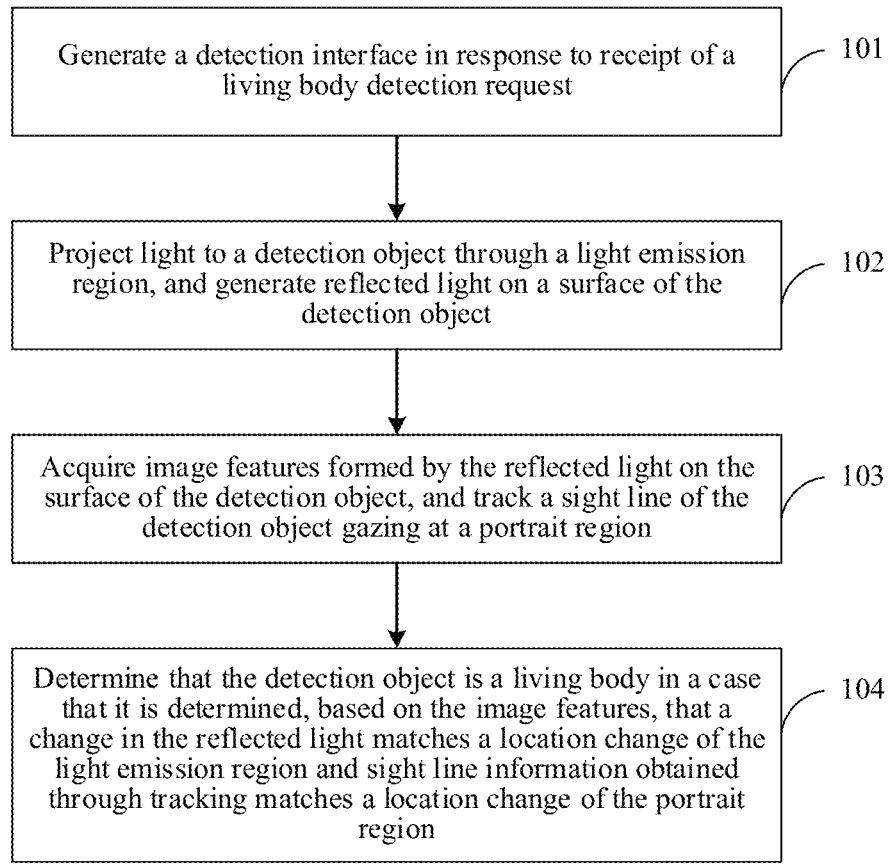
FIG. 2 is a flowchart of a living body detection method according to an embodiment of this disclosure.
FIG. 3 is an example diagram of an initial interface in a living body detection method according to an embodiment of this disclosure.

As shown in FIG. 2, a specific procedure of the living body detection method may be as follows:

In step 101, a detection interface is generated in response to receipt of a living body detection request.

Specifically, the terminal may generate a detection interface in response to receipt of a living body detection request triggered by a user, or may generate a detection interface in response to receipt of a living body detection request sent by another device, or the like.

The detection interface may include at least a portrait region and a light emission region, and a location of the portrait region and a location of the light emission region may randomly change over time.

In an embodiment, the location of the portrait region and the location of the light emission region may be made to randomly change over time by using various policies. For example, an identifier (ID) sequence may be generated for each region, so that the portrait region and the light emission region may change based on the respective identifier sequences.

For example, generation of a portrait region identifier sequence and an emission region identifier sequence is used as an example. The portrait region identifier sequence is used for indicating a location change of the portrait region in the detection interface. The emission region identifier sequence is used for indicating a location change of the light emission region in the detection interface. In this embodiment, the step of "generating a detection interface in response to receipt of a living body detection request, the detection interface including a portrait region and a light emission region, and a location of the portrait region and a location of the light emission region randomly changing over time" may include: randomly generating a portrait region identifier sequence and an emission region identifier sequence in response to receipt of the living body detection request, and generating the detection interface based on the portrait region identifier sequence and the emission region identifier sequence, so that the detection interface includes the portrait region and the light emission region. The location of the portrait region may change based on the portrait region identifier sequence, and the location of the light emission region may change based on the emission region identifier sequence.

In an embodiment, the portrait region identifier sequence and the emission region identifier sequence each may be a sequence including a plurality of coordinates or region identifiers. For example, the portrait region identifier sequence and the emission region identifier sequence each may be a sequence including a plurality of region identifiers. In this case, the step of "randomly generating a portrait region identifier sequence and an emission region identifier sequence in response to receipt of the living body detection request" may include: generating an initial interface in response to receipt of the living body detection request, the initial interface including a plurality of candidate regions, and each candidate region having a region identifier, and then, randomly generating the portrait region identifier sequence and the emission region identifier sequence based on the region identifier of each candidate region in the initial interface.

It may be understood that, "a plurality of" in each embodiment of this disclosure means at least two.

In this embodiment, the step of "generating the detection interface based on the portrait region identifier sequence and the emission region identifier sequence" may include: selecting the portrait region from the plurality of candidate regions based on the portrait region identifier sequence, and selecting the light emission region from the plurality of candidate regions based on the emission region identifier sequence, or the like.

A representation form of the region identifier may be determined according to actual application requirements. For example, referring to FIG. 3, the initial interface is divided into nine candidate regions. In this case, region identifiers of the candidate regions may be respectively set to "1, 2, 3, 4, 5, 6, 7, 8, and 9", or as shown in FIG. 4, the region identifiers of the candidate regions may be set to "A1, A2, A3, B4, B5, B6, C7, C8, and C9", or the like.

In an embodiment, areas occupied by the portrait region and the light emission region in the detection interface may also be determined according to actual application requirements. For example, the initial interface is still divided into nine regions. In this case, the portrait region may be set to "occupying one candidate region" or "occupying two candidate regions", and the light emission region may be set to "occupying two consecutive candidate regions" (for example, referring to the left drawing of FIG. 5), "occupying three consecutive candidate regions", or "occupying four connected regions" (for example, referring to the right drawing of FIG. 5), or the like. For details, refer to FIG. 3, FIG. 4, and FIG. 5.

For example, the portrait region "occupies one candidate region", the light emission region may be set to "occupying three consecutive candidate regions", and region identifiers are identifiers shown in FIG. 3. In this case, when the portrait region identifier sequence is "1, 5, 7", and the emission region identifier sequence is "369, 123, 369", changes in the portrait region and the light emission region in the detection interface may be shown in FIG. 6.

Figures 4, 5:
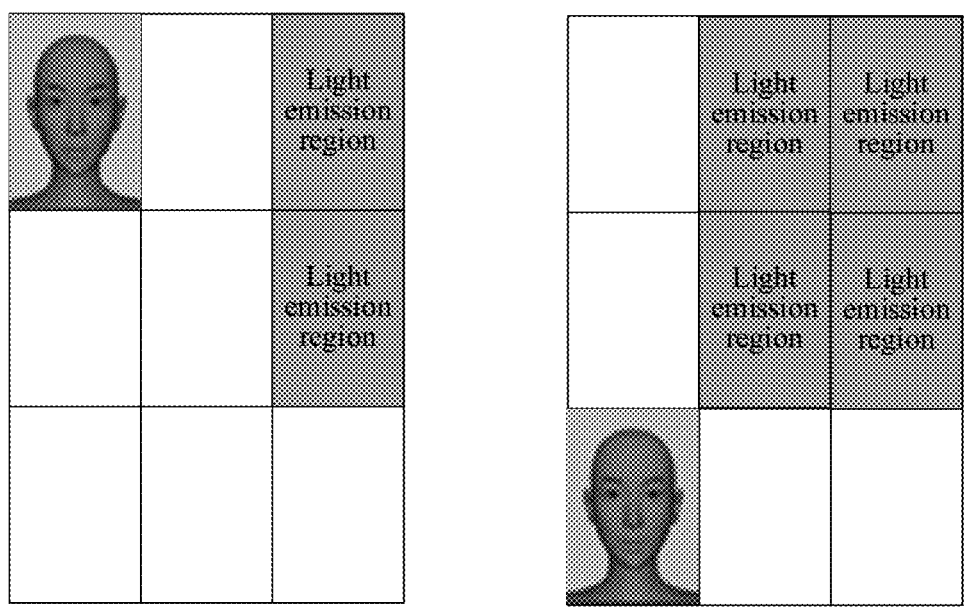
FIG. 4 is another example diagram of an initial interface in a living body detection method according to an embodiment of this disclosure.
FIG. 5 is an example diagram of a portrait region and a light emission region in a living body detection method according to an embodiment of this disclosure.

For another example, the portrait region "occupies one candidate region", the light emission region may be set to "occupying three consecutive candidate regions", and the region identifiers are identifiers shown in FIG. 4. In this case, when the portrait region identifier sequence is "A1, B5, C7", and the emission region identifier sequence is "A3B6C9, A1A2A3, A3B6C9", changes in the portrait region and the light emission region in the detection interface may be shown in FIG. 6.

That the portrait region identifier sequence and the emission region identifier sequence each have a sequence length of "3" is merely used as an example for description above. It is to be understood that, the sequence lengths of the portrait region identifier sequence and the emission region identifier sequence may be set according to actual application requirements. Details are not described herein again.

In an embodiment, in order to reduce the discomfort caused by the projected light to eyes of the detection object, during the generation of the portrait region identifier sequence and the emission region identifier sequence, the light emission region may be made to be as far away from the portrait region as possible. For example, the light emission region may be set as far as possible at an edge of the detection interface, or the like.

Specifically, A corresponding "farthest distance" identifier set may be set for the region identifier of each candidate region, and then, region identifiers of candidate regions whose region center points have a distance meeting a preset condition therebetween are added to the set.

For example, referring to FIG. 3, the region identifier "1" is used as an example, and in this case, a "farthest distance" identifier set corresponding to "1" may be "3, 6, 7, 8, and 9".

For another example, still referring to FIG. 3, the region identifier "3" is used as an example, and in this case, a "farthest distance" identifier set corresponding to "3" may be "1, 4, 7, 8, and 9", or the like.

In this way, when the generated portrait region identifier sequence (or emission region identifier sequence) includes "1", a region identifier, corresponding to "1", in the emission region identifier sequence (or the portrait region identifier sequence) may be any one or more of "3, 6, 7, 8, and 9". Similarly, when the generated portrait region identifier sequence (or emission region identifier sequence) includes "3", "a region identifier, corresponding to 3", in the emission region identifier sequence (or the portrait region identifier sequence) may be any one or more of "1, 4, 7, 8, and 9". The rest can be deduced by analogy. That is, when the portrait region identifier sequence is "1, 3, 1", the emission region identifier sequence may be "369, 789, 369", "369, 147, 789", or "789, 147, 369", or the like (that the portrait region occupies one candidate region and the emission region occupies three consecutive candidate regions is used as an example for description).

In an embodiment, in order to improve accuracy and security of living body detection, a location change frequency of each of the portrait region and the light emission region may be non-fixed in addition to fixed. That is, duration of each time of location switching of the portrait region and duration of each time of location switching of the light emission region may be different. For example, the portrait region remains at a location with a region identifier of "1" for 1 second and then changes to a location with a region identifier of "3"; remains at the location with the region identifier of "3" for 2 seconds and then changes to a location with a region identifier of "6"; remains at the location with the region identifier of "6" for 1.5 seconds and then changes to a location with a region identifier of "5"; and so on. The light emission region is similar to this.

The duration of each time of location switching of the portrait region and the duration of each time of location switching of the light emission region may be set according to actual application requirements. Details are not described herein again.

For ease of description, in this embodiment of this disclosure, a time point of each time of location switching of the portrait region is referred to as "a burst change time point of the location of the portrait region", and a time point of each time of location switching of the light emission region is referred to as "a burst change time point of the location of the light emission region".

In an embodiment, the burst change time point of the location of the portrait region and the burst change time point of the location of the light emission region may be the same or may be different. However, for ease of control, the burst change time points of the two may be set to be the same.

In step 102, light is projected to a detection object through a light emission region, and can generate reflected light on a surface of the detection object.

Because the location of the light emission region may randomly change over time, and different light emission regions may be projected on different parts of the surface of the detection object, the surface of the detection object naturally generates different reflected light, and the emitted light may be reflected in an image as different image features. As a result, this may be subsequently used as a basis for living body detection. For details, refer to subsequent steps.

In an embodiment, for ease of better subsequent identification of changes in light (that is, the reflected light) on the surface of the detection object, in addition to being performed based on a location of the reflected light, distinguishing may also be performed based on a color or intensity of the light. That is, when the light is projected to the detection object through the light emission region, the color or intensity of the projected light may change according to a preset rule.

The change rule may alternatively be controlled by generating a sequence. For example, a light color sequence may be randomly generated in response to receipt of the living body detection request (step 101). In this way, at this time, light that changes according to the light color sequence may be projected to the detection object through the light emission region, and reflected light is generated on the surface of the detection object.

Alternatively, similarly, a light intensity sequence may be randomly generated in response to receipt of the living body detection request (step 101). In this way, at this time, light that changes according to the light intensity sequence may be projected to the detection object through the light emission region, and reflected light is generated on the surface of the detection object, or the like.

For ease of better subsequent identification of changes in light, during generation of a light color sequence, colors with a large color difference (for example, a color difference greater than a preset threshold) may be selected as adjacent colors. For example, in a preset color space, a screen changes from the brightest red to the brightest green, and chromaticity of the reflected light has a largest change. Therefore, the light color sequence may be "red, green, red, green", and so on.

Similarly, during generation of a light intensity sequence, a difference between adjacent intensity values in the light intensity sequence may be made to be greater than a specified threshold as much as possible, so that a change in light can be more easily identified. During the projection, display duration of each color (or intensity) of light may be set according to actual application requirements. For example, the display duration of each color of light may be set to 2 seconds, or the like.

In an embodiment, in order to further improve security, a light change rule may be further complicated. For example, the display duration of each color of light may be set to a different value. For example, display duration of green light may be 3 seconds, display duration of red light may be 2 seconds, display duration of blue light may be 4 seconds, and so on.

For ease of description, in this embodiment of this disclosure, a time point at which different colors of light switches is referred to as "a light color burst change time point", and a time point at which different intensity of light switches is referred to as "a light intensity burst change time point".

The burst change time point of the location of the portrait region, the burst change time point of the location of the light emission region, and the light color/intensity burst change time point may be the same or may be different. However, for ease of control and maintenance, the three burst change time points may be set to be the same.

In step 103, image features formed by the reflected light on the surface of the detection object is acquired, and a sight line of the detection object gazing at a portrait region is tracked. For example, details may be as follows:

(1) Images obtained during the gazing of the detection object at the portrait region under illumination of the projected light are acquired, to obtain a video stream, and then steps (2) and (3) are separately performed, where the steps (2) and (3) may be performed in no particular order.

For example, prompt information such as voice prompt information may be generated, to prompt the detection object to gaze at the portrait region (because the location of the portrait region may randomly change over time, the sight line of the detection object gazing at the portrait region naturally changes accordingly). Then, a camera process is called. Image acquisition of the detection object under the illumination of the projected light is performed through the camera process, and camera content is displayed in real time in the portrait region. An image sequence obtained through the acquisition is the video stream. In other words, the video stream may include a plurality of video frames, each video frame being an image.

Camera components corresponding to the camera process include but are not limited to a camera of the terminal, a webcam, a surveillance camera, other devices that can acquire images, and the like. The light projected to the detection object may be visible light or may be invisible light. Therefore, in the camera components provided in this embodiment of this disclosure, different light receivers such as infrared light receivers may further be configured according to actual application requirements to sense different light, so as to acquire a required video stream. Details are not described herein again.

In an embodiment, in order to reduce an impact of value fluctuations caused by noise on a subsequent image feature analysis, the video stream may further be denoised after the video stream is obtained. For example, a noise model is Gaussian noise. The noise may be specifically reduced as much as possible by using multi-frame averaging and/or same-frame multi-scale averaging on timing. Details are not described herein again.

In an embodiment, other pre-processing such as scaling, sharpening, and background blurring operations may be alternatively performed on the video stream, so as to improve efficiency and accuracy of subsequent recognition.

(2) The image features formed by the reflected light on the surface of the detection object are extracted from the video stream.

In an embodiment, if denoising and/or other pre-processing has been performed on the video stream in (1), a processed video stream is obtained. In this embodiment, specifically, the image features formed by the reflected light on the surface of the detection object may be extracted from the processed video stream.

In an embodiment, in order to improve efficiency and accuracy of subsequent recognition, after the video stream (or the processed video stream) is obtained, a target region may be cropped from the video frame first, and then image features are extracted from the target region.

For example, it is assumed that the target region is a face of the detection object (that is, the light is projected to the face of the detection object). In this embodiment, the video stream may be screened to obtain video frames that include the face of the detection object, then a face region is cropped from the video frames obtained through screening, and image features are extracted from the face region.

The video frames that include the face of the detection object may be obtained through screening in a plurality of manners. For example, face detection may be performed on each video frame by using a face detection model, to obtain the video frames that include the face of the detection object.

(3) Sight line information of the detection object gazing at the portrait region is calculated based on head information and eye information of the detection object in the video stream. For example, details may be as follows:

A. Determine a yaw, a pitch, and a roll of a head of the detection object in the video stream to obtain a head pose sequence.

For example, specifically, the yaw, the pitch, and the roll of the head of the detection object in the video stream may be detected by using a face pose estimation algorithm to obtain the head pose sequence. For example, details may be as follows:

A video frame that needs to be processed currently is determined based on the video stream, and a yaw, a pitch, and a roll of a head of a detection object in the video frame that needs to be processed currently is detected by using a face pose estimation algorithm to obtain head pose information corresponding to the video frame that needs to be processed currently. Then, the step of "determining, based on the video stream, a video frame that needs to be processed currently" is performed again, to detect head pose information for a next video frame.

The rest can be deduced by analogy. Finally, head pose information corresponding to all video frames in the video stream can be obtained. These pieces of head pose information are combined according to a time sequence of the video frames. In this way, a head pose sequence corresponding to the video stream can be obtained. The head pose sequence may be used as head information.

In an embodiment, in addition to including the head pose sequence, the head information may further include head coordinate parameters. Therefore, in order to improve accuracy of living body detection, after the video stream is obtained and before step C is performed, three-dimensional coordinates of the head of the detection object in the video stream may be further obtained to obtain the head coordinate parameters. For example, specifically, the video stream may be acquired by using a depth camera. In this way, the three-dimensional coordinates of the head of the detection object can be obtained from the video stream, and then the head coordinate parameters are obtained.

B. Detect eye features of the detection object in the video stream to obtain eye information.

For example, specifically, face feature points of the detection object in the video stream may be detected by using a face key point detection algorithm. Subsequently, the detected face feature points are screened to obtain eye feature points. Then, a pupil center is detected based on the eye feature points by using a pupil center detection algorithm to obtain a pupil center sequence.

For example, specifically, a video frame that needs to be processed currently may be determined based on the video stream, face feature points of a detection object in the video frame that needs to be processed currently are detected by using a face key point detection algorithm, and the detect face feature points are screened to obtain eye feature points. Then, pupil center information of the detection object in the video frame that needs to be processed currently is detected based on the eye feature points by using a pupil center detection algorithm based on gradient changes. Subsequently, the step of "determining, based on the video stream, a video frame that needs to be processed currently" may be performed again, to detect "pupil center information" of a next video frame. The rest can be deduced by analogy. Finally, pupil center information corresponding to all video frames in the video stream can be obtained. These pieces of pupil center information are combined according to a time sequence of the video frames. In this way, a pupil center sequence corresponding to the video stream can be obtained. The pupil center sequence may be used as eye information.

Step A and step B may be performed in no particular order.

C. Detect gaze points of the detection object in the video stream based on the head pose sequence and the eye information by using a preset detection model, to obtain sight line information of the detection object gazing at the portrait region. The sight line information obtained through tracking may include a gaze point sequence.

For example, specifically, each video frame in the video stream may be detected based on the head pose sequence and the eye information by using a preset detection model, to obtain a gaze point of the detection object in each video frame. These gaze points are combined according to a time sequence of the video frames. In this way, a gaze point sequence can be obtained.

In an embodiment, the sight line information obtained through tracking may further include information such as a sight line change time point sequence. The sight line change time point sequence may alternatively be obtained by inputting the head pose sequence and the eye information into the preset detection model. That is, during the detection of the gaze points, change time points of the gaze points in the video stream can also be detected, and then these change time points are combined according to a time sequence of the video frames. In this way, a sight line change time point sequence can be obtained.

If denoising and/or other pre-processing has been performed on the video stream in (1), a processed video stream is obtained. In this embodiment, specifically, gaze points of a detection object in the processed video stream may be detected by using a preset detection model, to obtain sight line information of the detection object gazing at the portrait region.

Certainly, if in step A, head coordinate parameters are also obtained. In this embodiment, the head coordinate parameters may also be considered as one of factors. That is, the gaze points of the detection object in the video stream (or the processed video stream) may be detected based on the head pose sequence, the head coordinate parameters, and the eye information by using the preset detection model, to obtain the sight line information of the detection object gazing at the portrait region.

The detection model may be trained by using a plurality of "head training sample pairs" labeled with gaze point true values (the head training sample pair may include a head pose sequence sample, an eye information sample, and the like). That is, the detection model may be obtained through machine learning (ML).

The ML is an interdisciplinarity, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving performance of the computer. The ML, as the core of artificial intelligence (AI), is a basic way to make the computer intelligent, and is applicable to various fields of AI. The ML and DL generally include technologies such as an artificial neural network, a belief network, reinforcement learning, transfer learning, and inductive learning. The AI is a theory, method, technology, and application system that uses a digital computer or a machine controlled by the digital computer to simulate, extend, and expand human intelligence, perceive an environment, acquire knowledge, and use knowledge to obtain an optimal result. The AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration, and the details are not repeated herein.

In an embodiment, the detection model may be trained by another device and then provided to the living body detection apparatus, or may be trained by the living body detection apparatus. That is, before the step of "detecting gaze points of the detection object in the video stream based on the head pose sequence and the eye information by using a preset detection model, to obtain sight line information of the detection object gazing at the portrait region", the living body detection method may further include:

obtaining a plurality of head training sample pairs labeled with gaze point true values, the head training sample pair including a head pose sequence sample, an eye information sample, and the like; then, predicting gaze points of the detection object in the head training sample pair by using an initial detection model, to obtain gaze point predictive values; and converging the initial detection model based on the gaze point true value and the gaze point predictive value to obtain the detection model.

In step 104, the detection object is determined to be a living body when based on the image features, a change in the reflected light matches a location change of the light emission region and sight line information obtained through tracking matches a location change of the portrait region. In an example, the detection object is determined to be a real person, rather than a replay or a forged material.

It is determined that the detection object is a non-living body when it is determined, based on the image features, that a change in the reflected light does not match a location change of the light emission region or sight line information obtained through tracking does not match a location change of the portrait region, that is, it is determined that the detection object is a replay or a forged material.

It may be determined, based on the image features in various manners, whether the change in the reflected light matches the location change of the light emission region, and it may be determined, in various manners, whether the sight line information obtained through tracking matches the location change of the portrait region. For example, specifically, any one of the following manners may be used:

(1) Manner 1

A region change sequence of the reflected light is generated based on the image features. It is determined that the detection object is a living body when the region change sequence matches the emission region identifier sequence and the sight line information obtained through tracking (such as a gaze point sequence) matches the portrait region identifier sequence.

For example, referring to FIG. 3, the portrait region identifier sequence is "1, 5, 7", and the emission region identifier sequence is "369, 123, 369". In this case, when the generated region change sequence of the reflected light is "369, 123, 369" and the gaze point sequence is "1, 5, 7", it may be determined that the detection object is a living body.

In an embodiment, in consideration of possible impacts of some external factors during implementation, actual values may have certain errors. Therefore, during matching of various sequences (such as matching the region change sequence with the emission region identifier sequence, or matching the gaze point sequence with the portrait region identifier sequence), if an error between two sequences falls within a preset range, it can still be considered that the two sequences are matched.

In an embodiment, if a color or intensity of the light projected by the light emission region changes according to a preset rule, for example, a line color sequence is also generated when the living body detection request is received, the change in the light may also be used as a consideration factor during matching. That is, in addition to manner 1, manner 2 and manner 3 may also be used for matching.

(2) Manner 2

A region change sequence and a light change sequence of the reflected light are generated based on the image features. It is determined that the detection object is a living body when the region change sequence matches the emission region identifier sequence, the light change sequence matches the light color sequence, and the sight line information obtained through tracking matches the portrait region identifier sequence.

In an embodiment, if a burst change time point of the location of the portrait region, a burst change time point of the location of the light emission region, and a light color/intensity burst change time point are the same, a sight line change time point, a burst change time point of a region of the reflected light, and a light burst change time point of the reflected light may also be used as consideration factors for living body detection. That is, in addition to manner 1 and manner 2, manner 3 may also be used for matching.

(3) Manner 3

A region change sequence, a region burst change time point sequence, a light change sequence, and a light burst change time point sequence of the reflected light are generated based on the image features. It is determined that the detection object is a living body when the region change sequence matches the emission region identifier sequence, the light change sequence matches the light color sequence, the gaze point sequence matches the portrait region identifier sequence, and a difference between every two of the sight line change time point sequence, the region burst change time point sequence, and the light burst change time point sequence is less than a specified value.

The specified value may be set according to actual application requirements, and details are not described herein.

Figure 7:
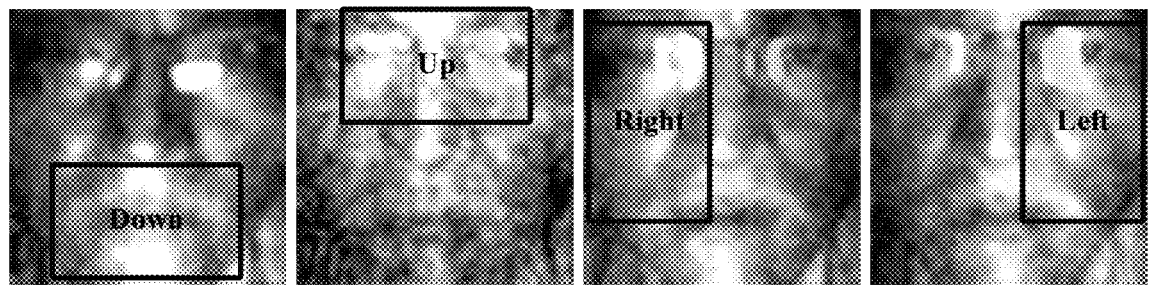
FIG. 7 is an example diagram of a strong light region formed by projected light from different directions in a living body detection method according to an embodiment of this disclosure.

During the location change of the light emission region, a direction of the light projected therefrom also changes and is then projected to different regions on the surface of the detection object. Therefore, light intensity in an orthographic projection region on the surface of the detection object is greater than that of another region, resulting in a different light intensity distribution. For example, the light is projected to a face, and the face is divided into four regions: upper, lower, left, and right regions. As shown in FIG. 7, when the light is orthographically projected to a lower part of the face, a strong light region is formed on the lower part of the face; when the light is orthographically projected to an upper part of the face, a strong light region is formed on the upper part of the face; and a left part and a right part are similar to this. Therefore, the region change sequence, the region burst change time point sequence, the light change sequence, the light burst change time point sequence, and the like of the reflected light can be generated by using changes in the strong light region. In other words, in the foregoing manner 1, manner 2, and manner 3, the step of "generating a region change sequence of the reflected light based on the image features" may include:

extracting image features of each video frame in the video stream; calculating distribution information of light intensity on the surface of the detection object based on the image features of the video frame; determining, based on the distribution information, that a region in which the light intensity meets a preset condition is a strong light region; and generating the region change sequence of the reflected light based on a location change of the strong light region in the video stream.

Similarly, the step of "generating a region change sequence and a light change sequence of the reflected light based on the image features" may include:

extracting image features of each video frame in the video stream; calculating distribution information of light intensity on the surface of the detection object based on the image features of the video frame; determining, based on the distribution information, that a region in which the light intensity meets a preset condition is a strong light region; generating the region change sequence of the reflected light based on a location change of the strong light region in the video stream; and generating the light change sequence of the reflected light based on a light color change of the strong light region in the video stream.

The step of "generating a region change sequence, a region burst change time point sequence, a light change sequence, and a light burst change time point sequence of the reflected light based on the image features" may include:

extracting image features of each video frame in the video stream; calculating distribution information of light intensity on the surface of the detection object based on the image features of the video frame; then determining, based on the distribution information, that a region in which the light intensity meets a preset condition is a strong light region; generating the region change sequence and the region burst change time point sequence of the reflected light based on a location change of the strong light region in the video stream; and generating the light change sequence and the light burst change time point sequence of the reflected light based on a light color change of the strong light region in the video stream.

The preset condition may be set according to actual application requirements. For example, a region with the strongest light intensity may be selected as the strong light region based on the distribution information, or the top two regions with the strongest light intensity may be selected as strong light regions based on the distribution information, or the like. Details are not described herein.

It can be learned from the foregoing description that, in this embodiment of this disclosure, a detection interface may be generated in response to receipt of a living body detection request, the detection interface including a portrait region and a light emission region, and a location of the portrait region and a location of the light emission region randomly changing over time. Subsequently, light may be projected to a detection object through the light emission region, to generate reflected light of the projected light on a surface of the detection object. Then, image features formed by the reflected light on the surface of the detection object are acquired, and a sight line of the detection object gazing at the portrait region is tracked. It is determined that the detection object is a living body when it is determined, based on the image features, that a change in the reflected light matches a location change of the light emission region and sight line information obtained through tracking matches a location change of the portrait region. Otherwise, the detection object is a non-living body. In this solution, the basis for determining a living body is the reflected light on the surface of the detection object and the sight line information of the detection object, and reflected light and sight line information of a real living body are different from those of a forged living body. Therefore, this solution can effectively resist synthetic face attacks. In addition, because the reflected light and the sight line information randomly change, an illegal intruder cannot attack by injecting pre-imaged videos. Therefore, generally, this solution can effectively resist various living body detection attacks and greatly improve a living body detection effect, thereby improving accuracy and security of identity authentication.

According to the method described in the foregoing embodiment, the following further provides detailed descriptions by using examples.

In this embodiment, that the living body detection apparatus is specifically integrated into a terminal and the color of the light projected by the light emission region changes over time is used as an example for description.

Figure 8:
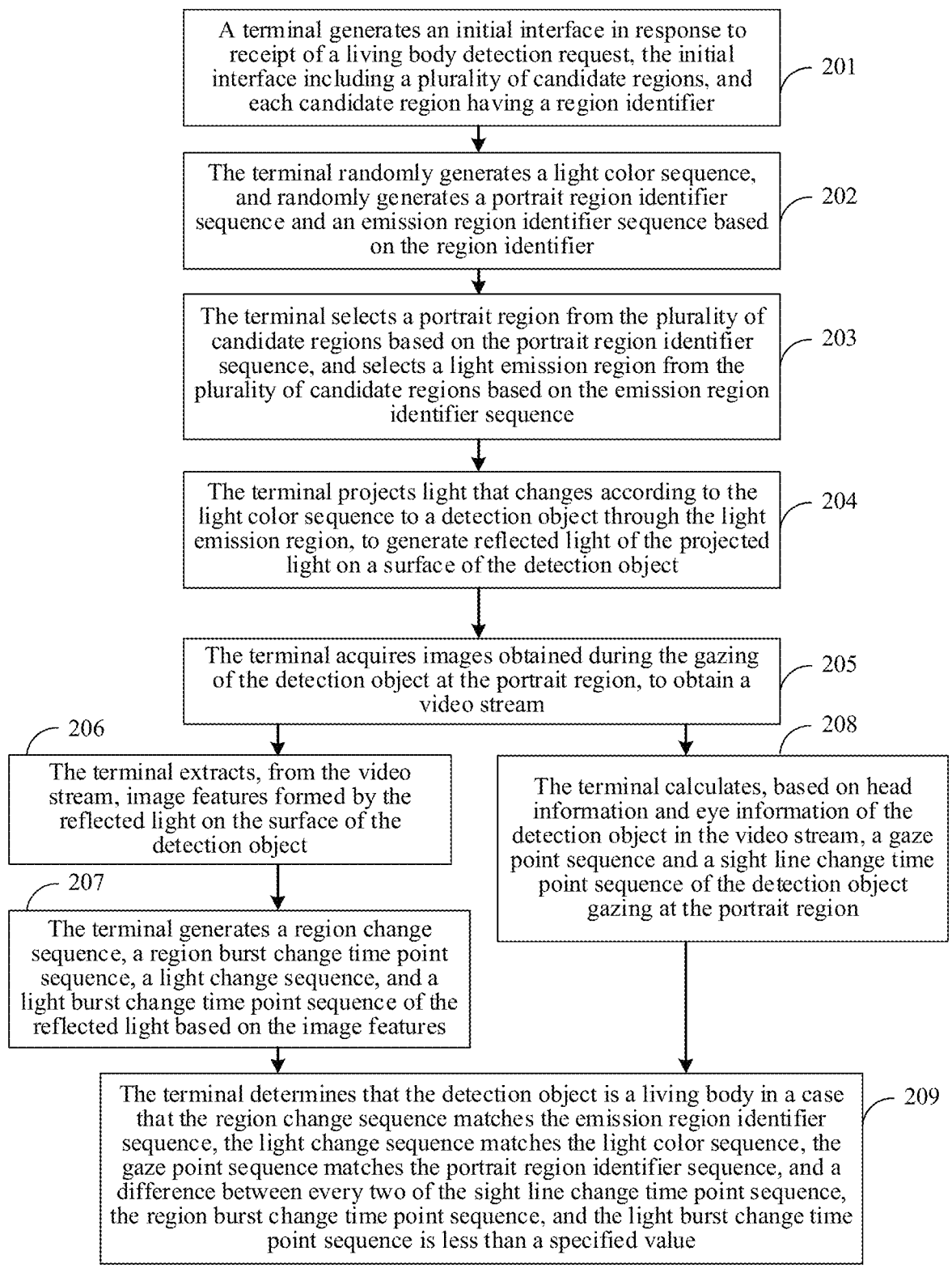
FIG. 8 is another flowchart of a living body detection method according to an embodiment of this disclosure.

As shown in FIG. 8, a specific procedure of a living body detection method may be as follows:

In step 201, a terminal generates an initial interface in response to receipt of a living body detection request, the initial interface including a plurality of candidate regions, and each candidate region having a region identifier.

The living body detection request may be triggered by a user or may be sent by another device to the terminal. For example, using user triggering as an example, when the user activates a living body detection function, such as clicking a start button of living body detection, generation of the living body detection request can be triggered, allowing the terminal to receive the living body detection request.

A division method and a quantity of the candidate regions, and a representation form of the region identifier both can be determined according to actual application requirements.

For example, as shown in FIG. 3, in this example, the initial interface includes nine candidate regions, and region identifiers are 1, 2, 3, 4, 5, 6, 7, 8, and 9, respectively.

For example, as shown in FIG. 4, in this example, the initial interface includes nine candidate regions, and region identifiers are A1, A2, A3, B4, B5, B6, C7, C8, and C9, respectively.

For example, as shown in FIG. 9, in this example, the initial interface includes 24 candidate regions, and region identifiers are A1, A2, A3, A4, A5, A6, B1, B2, B3, B4, B5, B6, C1, C2, C3, C4, C5, C6, D1, D2, D3, D4, D5, and D6, respectively.

In step 202, the terminal randomly generates a light color sequence, and randomly generates a portrait region identifier sequence and an emission region identifier sequence based on the region identifier.

The light color sequence is used for indicating a color change of the light projected by the light emission region. For example, if the light color sequence is "red, green, blue", it indicates that colors of the light projected by the light emission region are sequentially: red→green→blue.

In an embodiment, for ease of better subsequent identification of changes in light, during the generation of the light color sequence, colors with a large color difference (for example, a color difference greater than a preset threshold) may be selected as adjacent colors. For example, in a preset color space, a screen changes from the brightest red to the brightest green, and chromaticity of the reflected light has a largest change. Therefore, the light color sequence may be "red, green, red, green", and so on.

The portrait region identifier sequence is used for indicating a location change of the portrait region in the detection interface. The emission region identifier sequence is used for indicating a location change of the light emission region in the detection interface.

Sequence lengths of the light color sequence, the portrait region identifier sequence, and the emission region identifier sequence may be set according to actual application requirements. Areas occupied by the portrait region and the light emission region in the detection interface may also be determined according to actual application requirements. Details are not described herein.

In step 203, the terminal selects the portrait region from the plurality of candidate regions based on the portrait region identifier sequence, and selects the light emission region from the plurality of candidate regions based on the emission region identifier sequence.

Figure 6:
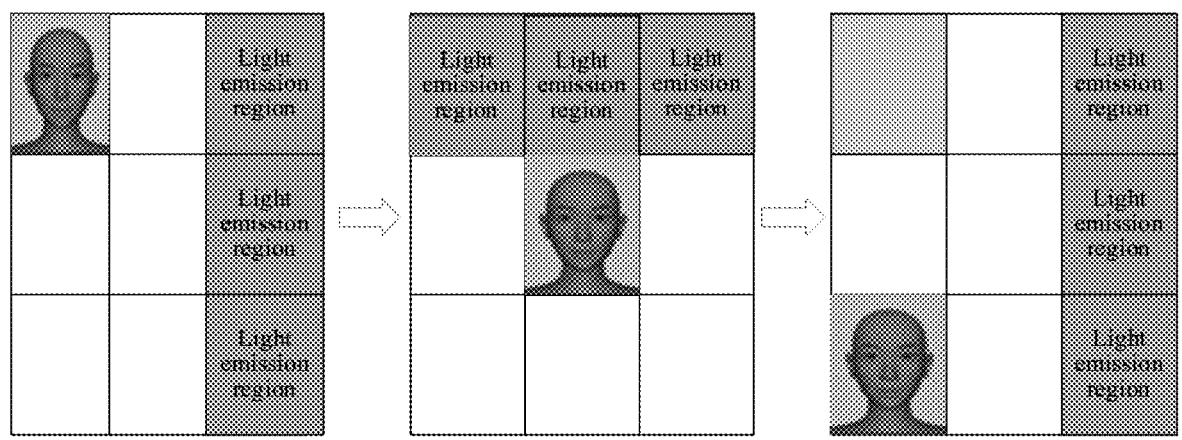
FIG. 6 is an example diagram of changes in a portrait region and a light emission region in a living body detection method according to an embodiment of this disclosure.

For example, referring to FIG. 3, that the initial interface is divided into nine candidate regions and region identifiers are respectively 1, 2, 3, 4, 5, 6, 7, 8, and 9 is used as an example. In this case, details may be as follows:

If the generated portrait region identifier sequence is "1, 5, 7", it indicates that a candidate region with a region identifier of "1" needs to be selected as the portrait region first. Then, the location of the portrait region is changed from the candidate region with the region identifier of "1" to a candidate region with a region identifier of "5". Finally, the location of the portrait region is changed from the candidate region with the region identifier of "5" to a candidate region with a region identifier of "7", and so on, referring to FIG. 6 (a region of a portrait in FIG. 6 is the portrait region).

If the generated emission region identifier sequence is "369, 123, 369", it indicates that candidate regions with region identifiers of "3", "6", and "9" need to be selected as light emission regions first. Then, the locations of the light emission regions are changed from the candidate regions with the region identifiers of "3", "6", and "9" to candidate regions with region identifiers of "1", "2", and "3". Finally, the locations of the light emission regions are changed from the candidate regions with the region identifiers of "1", "2", and "3" to candidate regions with region identifiers of "3", "6", and "9", and so on, referring to FIG. 6.

In order to improve accuracy and security of living body detection, a location change frequency of each of the portrait region and the light emission region may be non-fixed in addition to fixed. For example, the portrait region remains at a location with a region identifier of "1" for 1 second and then changes to a location with a region identifier of "5"; remains at the location with the region identifier of "5" for 2 seconds and then changes to a location with a region identifier of "7"; and so on. The light emission region is similar to this. Duration of each time of location switching of the portrait region and duration of each time of location switching of the light emission region may be set according to actual application requirements. Details are not described herein again.

In step 204, the terminal projects light that changes according to the light color sequence to the detection object through the light emission region, to generate reflected light of the projected light on the surface of the detection object, such as a face.

It is assumed that the light color sequence is "red, green, blue". In this embodiment, the terminal may project light to the detection object in a color sequence of red→green-→blue.

In an embodiment, in order to further improve security, a light change rule may be further complicated. For example, the display duration of each color of light may be set to a different value. For example, display duration of red light may be 3 seconds, display duration of green light may be 2 seconds, display duration of blue light may be 4 seconds, and so on.

The burst change time point of the location of the portrait region, the burst change time point of the location of the light emission region, and the light color burst change time point may be the same or may be different. For ease of description, in this embodiment, that the burst change time point of the location of the portrait region, the burst change time point of the location of the light emission region, and the light color burst change time point are the same is used as an example for description. In other words, each group of region identifiers (such as "1" or "5" or "7") in the portrait region identifier sequence, each group of region identifiers (such as "369" or "123") in the emission region identifier sequence, and each group of colors in the light color sequence are each in a one-to-one correspondence. In addition, when a portrait location changes, the location of the light emission region and the color of the projected light also change accordingly.

For example, that the portrait region identifier sequence is "1, 5, 7", the emission region identifier sequence is "369, 123, 369", and the light color sequence is "red, green, blue" is still used as an example. As shown in FIG. 10, when the portrait region is at a location with a region identifier of "1", the light emission region is at locations with region identifiers of "3", "6", and "9", and the color of the light projected by the light emission region is "red". When the portrait region is at a location with a region identifier of "5", the light emission region also switches to locations with region identifiers of "1", "2", and "3", and the color of the light projected by the light emission region changes to "green". The rest can be deduced by analogy. When the portrait region switches to a location with a region identifier of "7", the light emission region switches to locations with region identifiers of "3", "6", and "9", and the color of the light projected by the light emission region changes to "blue", and so on.

In step 205, the terminal acquires images obtained during the gazing of the detection object at the portrait region, to obtain a video stream.

The terminal acquires images obtained during the gazing of the detection object at the portrait region under illumination of the projected light, to obtain a video stream.

For example, the terminal may generate voice prompt information, such as "Please gaze at the portrait region on the screen", to prompt the detection object to gaze at the portrait region; then, call a camera process in the terminal, to control, through the camera process, a corresponding camera component to perform video acquisition on the detection object under the illumination of the projected light; and display acquired camera content in real time in the portrait region.

The camera component corresponding to the camera process includes but is not limited to a camera of the terminal, a webcam, a surveillance camera, other devices that can acquire images, and the like.

In an embodiment, in order to reduce an impact of value fluctuations caused by noise on a subsequent image feature analysis, denoising or other pre-processing such as scaling, sharpening, or background blurring may further be performed on the video stream after the video stream is obtained, so as to improve efficiency and accuracy of subsequent recognition.

In step 206, the terminal extracts, from the video stream, image features formed by the reflected light on the surface of the detection object, and then performs step 207.

If denoising and/or other pre-processing has been performed on the video stream in step 205, a processed video stream is obtained. In this embodiment, the terminal may extract, from the processed video stream, the image features formed by the reflected light on the surface of the detection object.

In an embodiment, in order to improve efficiency and accuracy of subsequent recognition, after the video stream (or the processed video stream) is obtained, the terminal may crop a target region from the video frame first, and then extract image features from the target region. Other regions or video frames that do not include the target region (such as a region including the face of the detection object) may not be processed.

For example, the target region is "a face region of the detection object". In this embodiment, as shown in FIG. 11, the terminal may perform face detection on each video frame by using a face detection model, to obtain the video frames that include the face of the detection object; then, determine locations of the face of the detection object from the video frames that include the face of the detection object; crop face regions of the detection object based on the locations; and extract image features from the face regions, to obtain image features formed by the reflected light on the face of the detection object.

In an embodiment, after cropping the face regions of the detection object, the terminal may further crop face core regions based on detected face key points, and then extract image features from the face core regions, to obtain the image features formed by the reflected light on the face of the detection object.

In an embodiment, because eye information further needs to be extracted subsequently, the terminal may further crop a region of eyes from the face region to obtain an eye region, for example, referring to FIG. 11. In this way, eye feature points can be subsequently extracted based on the eye region in a targeted manner, thereby improving processing efficiency.

In step 207, the terminal generates a region change sequence, a region burst change time point sequence, a light change sequence, and a light burst change time point sequence of the reflected light based on the image features. Details may be as follows:

The terminal extracts image features of each video frame in the video stream; calculates distribution information of light intensity on the surface of the detection object based on the image features of the video frame; then determines, based on the distribution information, that a region in which the light intensity meets a preset condition is a strong light region; generates the region change sequence and the region burst change time point sequence of the reflected light based on a location change of the strong light region in the video stream; and generates the light change sequence and the light burst change time point sequence of the reflected light based on a light color change of the strong light region in the video stream.

Figure 12:
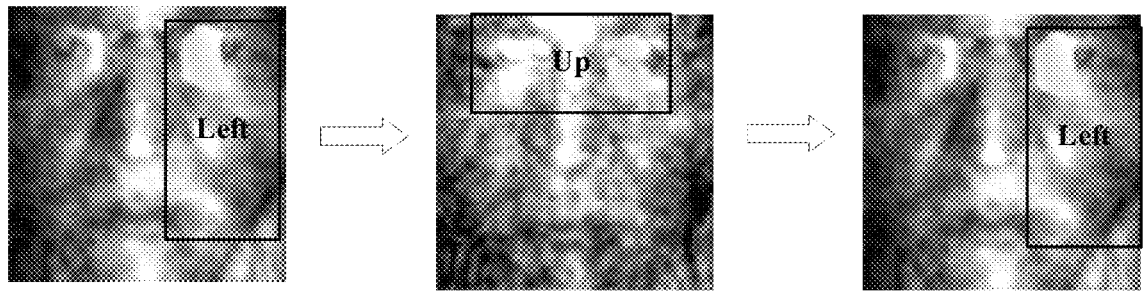
FIG. 12 is an example diagram of changes in a strong light region in a living body detection method according to an embodiment of this disclosure.

The preset condition may be set according to actual application requirements. For example, a region with the strongest light intensity is selected. As shown in FIG. 12, a region in a box in the figure is a strong light region. In this case, the region change sequence and the region burst change time point sequence of the reflected light may be generated based on a location change of the strong light region in FIG. 12, and the light change sequence and the light burst change time point sequence of the reflected light are generated based on a light color change of the strong light region FIG. 12.

For example, the detection interface shown in FIG. 3 and that the light emission region occupies three candidate regions are used as an example. Because the strong light region in the first diagram of FIG. 12 is located on a left side of the face, it indicates that the light is projected from a left region of the detection interface, and it can be determined that region identifiers of the light emission region are "3", "6", and "9". Similarly, because the strong light region in the second diagram in FIG. 12 is located on an upper side of the face, it indicates that the light is projected from an upper region of the detection interface, and it can be determined that region identifiers of the light emission region are "1", "2", and "3". By analogy, it can be determined that region identifiers of the light emission region corresponding to the third diagram in FIG. 12 are "3", "6", and "9". Therefore, the finally generated region change sequence of the reflected light is "369, 123, 369", and the region burst change time point sequence and the light burst change time point sequence are generated based on a change time point of the strong light region in FIG. 12.

FIG. 12 is still used as an example. In FIG. 12, if a color of the light in the strong light region in the first diagram is red, a color of the light in the strong light region in the second diagram is green, and a color of the light in the strong light region in the third diagram is blue. In this embodiment, the generated light change sequence of the reflected light may be "red, green, blue", and generated based on a change time point of the color of the light in the strong light region.

In step 208, the terminal calculates, based on head information and eye information of the detection object in the video stream, a gaze point sequence and a sight line change time point sequence of the detection object gazing at the portrait region.

Figure 13:
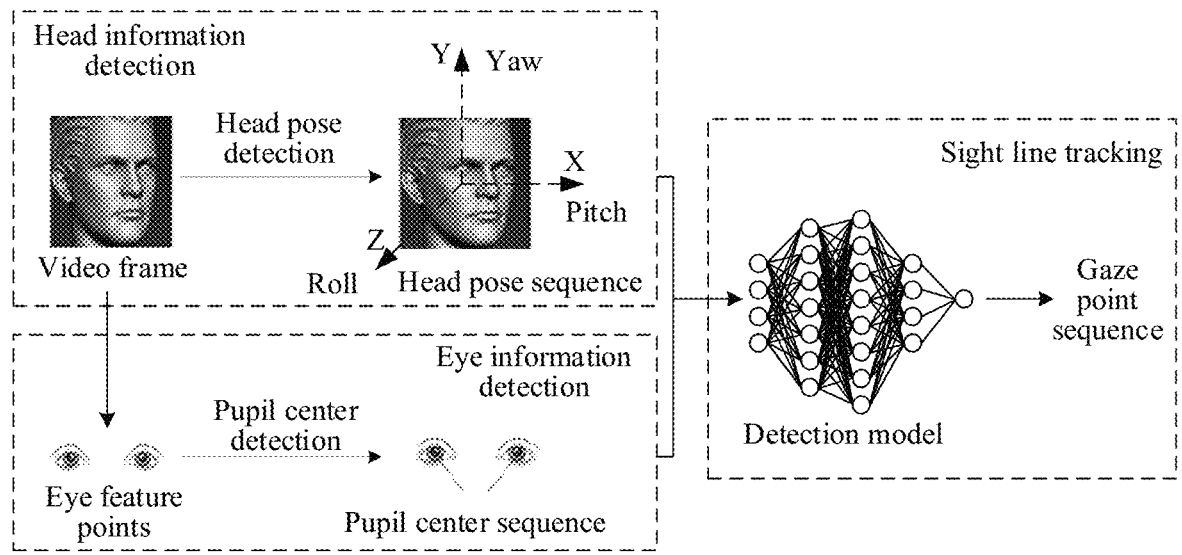
FIG. 13 is an example diagram of a detection model used for sight line tracking according to an embodiment of this disclosure.

For example, as shown in FIG. 13, on one hand, the terminal may detect a yaw, a pitch, and a roll of a head of the detection object in the video stream by using a face pose estimation algorithm, to obtain a head pose sequence. On the other hand, the terminal may detect face feature points of the detection object in the video stream by using a face key point detection algorithm; screen the face feature points to obtain eye feature points; then detect a pupil center based on the eye feature points by using a pupil center detection algorithm to obtain a pupil center sequence; and then, detect gaze points of the detection object in the video stream based on the head pose sequence and the pupil center sequence by using a preset detection model to obtain a gaze point sequence and a sight line change time point sequence of the detection object.

The detection model may be trained by using a plurality of "head training sample pairs" labeled with gaze point true values. For details, refer to the foregoing embodiment, which is not described herein again.

If an eye region is also cropped in step 206, during the extraction of the eye feature points, the terminal may also directly detect face feature points in the eye region by using a face key point detection algorithm to obtain eye feature points, without a need to extract face feature points from a region other than the eye region.

In addition, if denoising and/or other pre-processing has been performed on the video stream in step 205, a processed video stream is obtained. In this embodiment, specifically, gaze points of a detection object in the processed video stream may be detected by using a preset detection model, to obtain sight line information of the detection object gazing at the portrait region. Details are not described herein.

In an embodiment, in addition to including the head pose sequence, the head information may further include head coordinate parameters. Therefore, in order to improve accuracy of living body detection, when the terminal is acquiring a video, a depth camera is used. In this embodiment, the terminal may further obtain three-dimensional coordinates of the head of the detection object in the video stream to obtain the head coordinate parameters. In this way, during the calculation of the gaze point sequence and the sight line change time point sequence of the detection object gazing at the portrait region, the head coordinate parameters can be used as one of consideration factors. That is:

the terminal may detect the gaze points of the detection object in the video stream based on the head coordinate parameters, the head pose sequence, and the pupil center sequence by using a preset detection model, to obtain a gaze point sequence and a sight line change time point sequence of the detection object.

Certainly, if the head coordinate parameters are also used as a consideration factor for calculating the gaze point sequence and the sight line change time point sequence of the detection object gazing at the portrait region, during training of the detection model, the head coordinate parameters also need to be considered. That is, in addition to including the head pose sequence sample and the eye information sample, "the head training sample pair" may further include a head coordinate parameter sample. A specific training method is similar to one without considering the "head coordinate parameter sample". For details, refer to the foregoing embodiment, which is not described herein again.

Steps 206 and 208 may be performed in no particular order.

In step 209, the terminal determines that the detection object is a living body when the region change sequence matches the emission region identifier sequence, the light change sequence matches the light color sequence, the gaze point sequence matches the portrait region identifier sequence, and a difference between every two of the sight line change time point sequence, the region burst change time point sequence, and the light burst change time point sequence is less than a specified value.

The terminal may determine that the detection object is a non-living body when the region change sequence does not match the emission region identifier sequence, or the light change sequence does not match the light color sequence, and the gaze point sequence does not match the portrait region identifier sequence, and a difference between every two of the sight line change time point sequence, the region burst change time point sequence, and the light burst change time point sequence is greater than or equal to a specified value.

The specified value may be set according to actual application requirements, and details are not described herein.

It can be learned from the foregoing description that, in this embodiment of this disclosure, the terminal may randomly generate a light color sequence, a portrait region identifier sequence, and an emission region identifier sequence in response to receipt of a living body detection request, and generate a detection interface accordingly. The detection interface includes a portrait region and a light emission region, the portrait region may change based on the portrait region identifier sequence, and the light emission region changes based on the emission region identifier sequence. Subsequently, light that changes according to the light color sequence can be projected to a detection object through the light emission region, so that the projected light generates reflected light on a surface of the detection object. Then image features formed by the reflected light on the surface of the detection object are acquired to analyze a change in the emitted light accordingly, and a sight line of the detection object gazing at the portrait region is tracked. It is determined that the detection object is a living body when a change in the reflected light matches the emission region identifier sequence and the light color sequence, sight line information obtained through tracking matches the portrait region identifier sequence, and a difference between every two of a sight line change time point sequence, a region burst change time point sequence, and a light burst change time point sequence is less than a specified value. Otherwise, the detection object is a non-living body. In this solution, the basis for determining a living body is the reflected light on the surface of the detection object and the sight line information of the detection object, and reflected light and sight line information of a real living body are different from those of a forged living body. Therefore, this solution can effectively resist synthetic face attacks. In addition, because a direction, a color, and sight line information of the reflected light all change randomly, an illegal intruder cannot attack by injecting pre-imaged videos. Therefore, generally, this solution can effectively resist various living body detection attacks and greatly improve a living body detection effect, thereby improving accuracy and security of identity authentication.

In this embodiment, That the living body detection apparatus is specifically integrated into a detection system is used as an example for description. The detection system includes a front-end device and a backend. The front-end device may be a terminal, and the backend may be a device such as a server.

Figure 14:
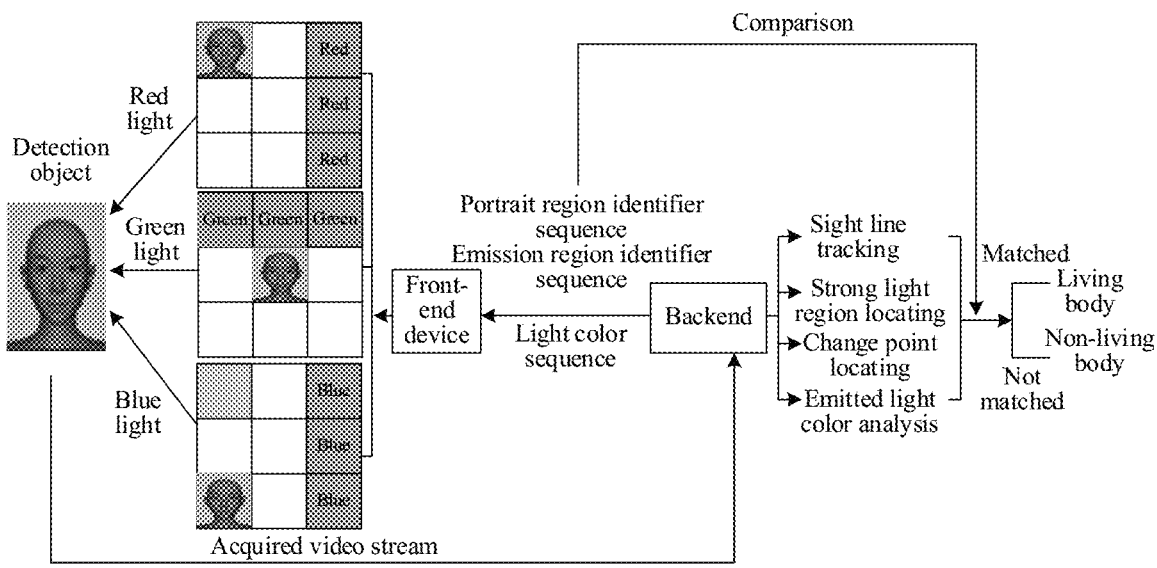
FIG. 14 is an example diagram of a frame of a detection system according to an embodiment of this disclosure.

For example, as shown in FIG. 14, a portrait region identifier sequence, an emission region identifier sequence, and a light color sequence may be randomly generated at the backend of the detection system, and transferred to the front-end device. The front-end device generates a detection interface based on the portrait region identifier sequence, the emission region identifier sequence, and the light color sequence. The location of the portrait region in the detection interface changes based on the portrait region identifier sequence, the location of the light emission region in the detection interface changes based on the emission region identifier sequence, and the color of the light projected by the light emission region changes based on the light color sequence. Subsequently, the front-end device acquires the detection object. For example, the front-end device analyzes the light emitted by the surface of the detection object (such as locating a strong light region, locating a change point, and analyzing the color of the reflected light), tracks a sight line of the detection object, and compares a result of the analysis and a result of the tracking with the generated portrait region identifier sequence, emission region identifier sequence, and light color sequence, so as to determine whether the detection object is a living body.

That the front-end device is specifically a terminal and the backend is a server is used as an example below for detailed description.

Figure 15:
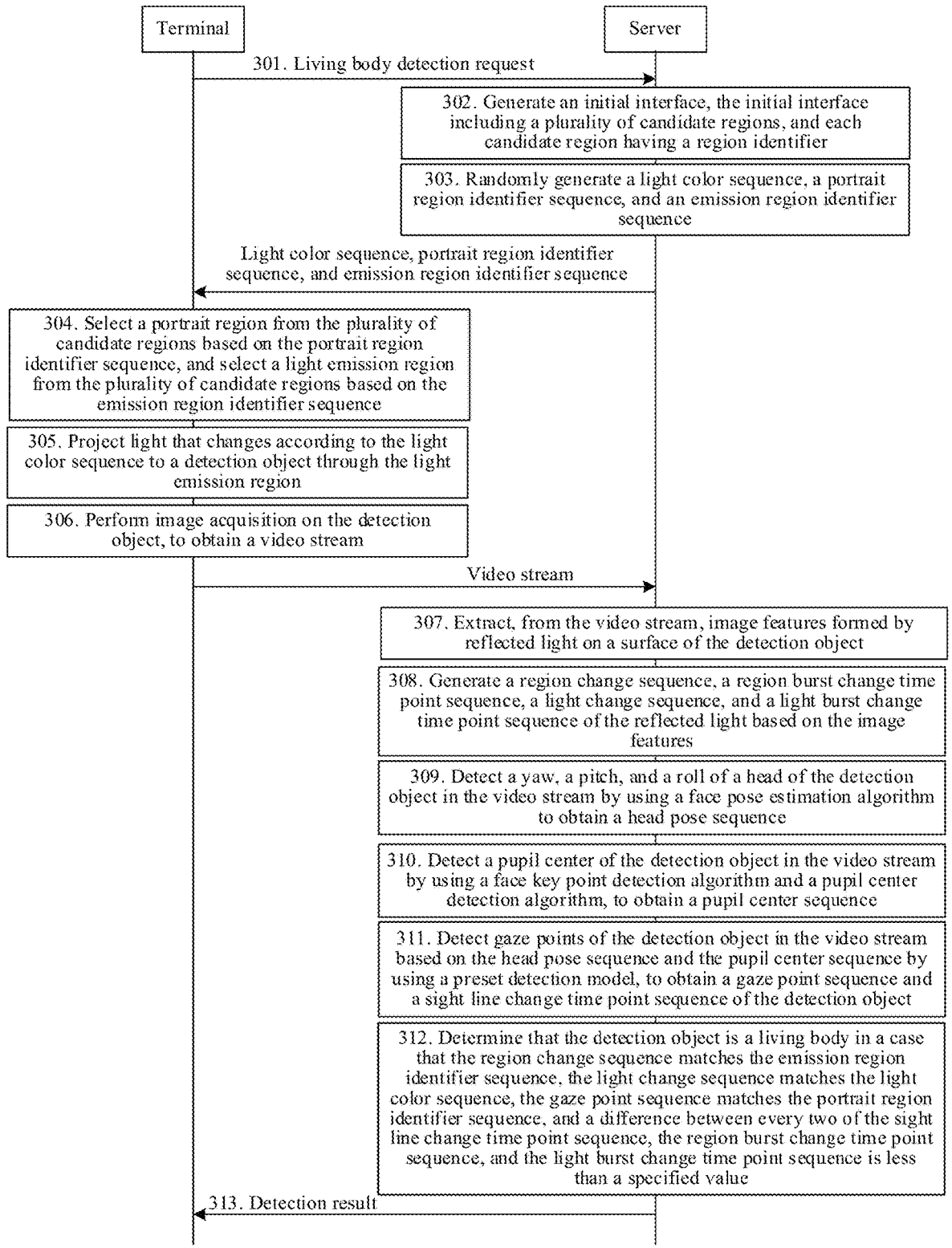
FIG. 15 is still another flowchart of a living body detection method according to an embodiment of this disclosure.

As shown in FIG. 15, a specific procedure of a living body detection method may be as follows:

In step 301, a terminal sends a living body detection request to a server in response to receipt of the living body detection request.

The living body detection request may be triggered by a user, or may be sent by another device to the terminal. For details, refer to the foregoing embodiment, which is not described herein again.

In step 302, the server generates an initial interface in response to receipt of the living body detection request, the initial interface including a plurality of candidate regions, and each candidate region having a region identifier.

In an embodiment, a division method and a quantity of the candidate regions, and a representation form of the region identifier both can be determined according to actual application requirements, for example, referring to the division method and the representation form of the region identifier in each of FIG. 3, FIG. 4, and FIG. 9. For details, refer to the foregoing embodiment.

In step 303, the server randomly generates a light color sequence, randomly generates a portrait region identifier sequence and an emission region identifier sequence based on the region identifier, and sends the initial interface, the portrait region identifier sequence, the emission region identifier sequence, and the light color sequence to the terminal.

The light color sequence is used for indicating a color change of the light projected by the light emission region. The portrait region identifier sequence is used for indicating a location change of the portrait region in the detection interface. The emission region identifier sequence is used for indicating a location change of the light emission region in the detection interface. For details, refer to the foregoing embodiment, which is not described herein again.

In an embodiment, in order to improve security of data transmission, the initial interface, the portrait region identifier sequence, the emission region identifier sequence, and the light color sequence may be encrypted before being sent to the terminal. That is, the server may encrypt all or part of data in the initial interface, the portrait region identifier sequence, the emission region identifier sequence, and the light color sequence to obtain encrypted data, and then send the encrypted data to the terminal.

A specific encryption algorithm may be determined according to actual application requirements.

In step 304, the terminal selects a portrait region from the plurality of candidate regions in the initial interface based on the portrait region identifier sequence, and selects a light emission region from the plurality of candidate regions based on the emission region identifier sequence.

In an embodiment, if the data received by the terminal has been encrypted by the server (that is, the data is encrypted data), the terminal needs to decrypt the encrypted data first to obtain a decrypted initial interface, portrait region identifier sequence, emission region identifier sequence, and light color sequence, then selects a portrait region from the plurality of candidate regions in the initial interface based on the portrait region identifier sequence, and selects a light emission region from the plurality of candidate regions based on the emission region identifier sequence.

In step 305, the terminal projects light that changes according to the light color sequence to a detection object through the light emission region, to generate reflected light of the projected light on a surface of the detection object, such as a face.

In step 306, the terminal acquires images obtained during gazing of the detection object at the portrait region under illumination of the projected light, to obtain a video stream, and sends the acquired video stream to the server.

In an embodiment, in order to improve security of data transmission, before sending the video stream to the server, the terminal may encrypt the video stream to obtain an encrypted video stream, and then send the encrypted video stream to the server.

Step 304 to 306 are performed similarly to steps 203 to 205 in the previous embodiment, and details are not described herein again.

In step 307, the server extracts, from the video stream, image features formed by the reflected light on the surface of the detection object, and then performs step 308.

In an embodiment, it is assumed that the terminal has encrypted the video stream in step 306. In this embodiment, the server needs to decrypt the received encrypted video stream, and then extracts, from the decrypted video stream, the image features formed by the reflected light on the surface of the detection object.

In an embodiment, in order to improve efficiency and accuracy of subsequent recognition, after obtaining the video stream, the server may crop a target region from the video frame first, and then extract image features from the target region. Other regions or video frames that do not include the target region may not be processed.

For example, the target region is "a face region of the detection object". In this case, as shown in FIG. 11, the server may perform face detection on each video frame by using a face detection model, to obtain video frames that include the face of the detection object; then, determine locations of the face of the detection object from the video frames that include the face of the detection object; crop face regions of the detection object based on the locations; and extract image features from the face regions, to obtain image features formed by the reflected light on the face of the detection object.

In an embodiment, after cropping the face regions of the detection object, the server may further crop face core regions based on detected face key points, and then extract image features from the face core regions, to obtain the image features formed by the reflected light on the face of the detection object.

In an embodiment, eye information further needs to be extracted subsequently. Therefore, the server may further crop a region of eyes from the face region to obtain an eye region, so as to subsequently extract eye feature points based on the eye region, instead of extracting the feature points of the entire face region and then screening the feature points to obtain the eye feature points.

In step 308, the server generates a region change sequence, a region burst change time point sequence, a light change sequence, and a light burst change time point sequence of the reflected light based on the image features.

Details may be as follows:

The server extracts image features of each video frame in the video stream; calculates distribution information of light intensity on the surface of the detection object based on the image features of the video frame; then determines, based on the distribution information, that a region in which the light intensity meets a preset condition (which may be set according to actual application requirements) is a strong light region, such as selecting a region with the maximum light intensity as the strong light region; generates the region change sequence and the region burst change time point sequence of the reflected light based on a location change of the strong light region in the video stream; and generates the light change sequence and the light burst change time point sequence of the reflected light based on a light color change of the strong light region in the video stream. For details, refer to the foregoing embodiment, which is not described herein again.

In step 309, the server detects a yaw, a pitch, and a roll of a head of the detection object in the video stream by using a face pose estimation algorithm to obtain a head pose sequence.

In step 310, the server detects a pupil center of the detection object in the video stream by using a face key point detection algorithm and a pupil center detection algorithm, to obtain a pupil center sequence.

Details may be as follows:

The server detects face feature points of the detection object in the video stream by using a face key point detection algorithm, screens the detected face feature points to obtain eye feature points, and then detects a pupil center based on the eye feature points by using a pupil center detection algorithm to obtain a pupil center sequence.

If an eye region is also cropped in step 307, during the extraction of the eye feature points, the server may also directly detect face feature points in the eye region by using a face key point detection algorithm to obtain eye feature points, without a need to extract face feature points from a region other than the eye region.

Steps 307, 309, and 310 may be performed in no particular order.

In step 311, the server detects gaze points of the detection object in the video stream based on the head pose sequence and the pupil center sequence by using a preset detection model, to obtain a gaze point sequence and a sight line change time point sequence of the detection object.

The detection model may be trained by using a plurality of "head training sample pairs" labeled with gaze point true values. For details, refer to the foregoing embodiment, which is not described herein again.

In an embodiment, in addition to including the head pose sequence, the head information may further include head coordinate parameters. Therefore, in order to improve accuracy of living body detection, when the terminal is acquiring a video, a depth camera is used. In this embodiment, the server may further obtain three-dimensional coordinates of the head of the detection object in the video stream to obtain the head coordinate parameters. In this way, during the calculation of the gaze point sequence and the sight line change time point sequence of the detection object gazing at the portrait region, the head coordinate parameters can be used as one of consideration factors. That is:

The server may detect the gaze points of the detection object in the video stream based on the head coordinate parameters, the head pose sequence, and the pupil center sequence by using a preset detection model, to obtain a gaze point sequence and a sight line change time point sequence of the detection object.

Certainly, if the head coordinate parameters are also used as a consideration factor for calculating the gaze point sequence and the sight line change time point sequence of the detection object gazing at the portrait region, during training of the detection model, the head coordinate parameters also need to be considered. For details, refer to the foregoing embodiment, which is not described herein again.

In step 312, the server determines that the detection object is a living body when the region change sequence matches the emission region identifier sequence, the light change sequence matches the light color sequence, the gaze point sequence matches the portrait region identifier sequence, and a difference between every two of the sight line change time point sequence, the region burst change time point sequence, and the light burst change time point sequence is less than a specified value, and generates a detection result indicating that the detection object is a living body.

The server may determine that the detection object is a non-living body when the region change sequence does not match the emission region identifier sequence, the light change sequence does not match the light color sequence, the gaze point sequence does not match the portrait region identifier sequence, and a difference between every two of the sight line change time point sequence, the region burst change time point sequence, and the light burst change time point sequence is greater than or equal to a specified value, and generate a detection result indicating that the detection object is a non-living body.

The specified value may be set according to actual application requirements, and details are not described herein.

In step 313, the server sends the detection result to the terminal, and the terminal displays the detection result.

It can be learned from the foregoing description that, in this embodiment of this disclosure, in response to receipt of a living body detection request, the terminal may send the living body detection request to the server, and the server randomly generates an initial interface, a light color sequence, a portrait region identifier sequence, and an emission region identifier sequence and transmits them to the terminal. The terminal generates a detection interface accordingly. The detection interface includes a portrait region and a light emission region. The portrait region may change based on the portrait region identifier sequence, and the light emission region changes based on the emission region identifier sequence. Subsequently, the terminal projects light that changes according to the light color sequence to a detection object through the light emission region, performs video acquisition on the detection object, and then sends an acquired video stream to the server. The server analyzes reflected light, tracks a sight line based on the video stream, and determines that the detection object is a living body when a change in the reflected light matches the emission region identifier sequence and the light color sequence, sight line information obtained through tracking matches the portrait region identifier sequence, and a difference between every two of a sight line change time point sequence, a region burst change time point sequence, and a light burst change time point sequence is less than a specified value; otherwise, the detection object is a non-living body. In this solution, the basis for determining a living body is the reflected light on the surface of the detection object and the sight line information of the detection object, and reflected light and sight line information of a real living body are different from those of a forged living body. Therefore, this solution can effectively resist synthetic face attacks. In addition, because the reflected light and the sight line information randomly change, an illegal intruder cannot attack by injecting pre-imaged videos. Therefore, compared with the related solution, this solution can effectively resist various living body detection attacks and improve a living body detection effect, thereby helping improve accuracy and security of identity authentication.

In addition, in the solution provided in this embodiment, most operations involving computing and analysis can be performed by the backend such as the server. Therefore, compared with the previous embodiment, this embodiment can reduce load of the terminal, thereby helping improve performance of the terminal.

To better implement the foregoing method, an embodiment of this disclosure further provides a living body detection apparatus. The living body detection apparatus may be specifically integrated into an electronic device such as a terminal or a detection system. The terminal may be specifically a device such as a mobile phone, a tablet computer, a notebook computer, or a PC. The detection system may include a front-end device and a backend. The front-end device may be a terminal, and the backend may be a device such as a server.

Figure 16:
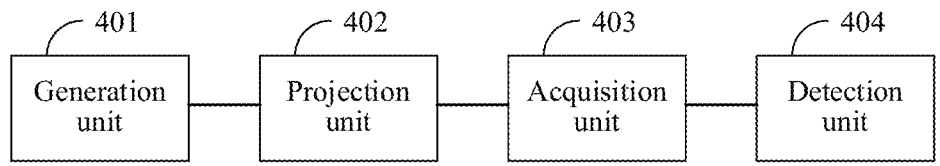
FIG. 16 is a schematic structural diagram of a living body detection apparatus according to an embodiment of this disclosure.

For example, as shown in FIG. 16, the living body detection apparatus includes a generation unit 401, a projection unit 402, an acquisition unit 403, and a detection unit 404. One or more units of the apparatus can be implemented by processing circuitry, software, or a combination thereof, for example.

(1) Generation Unit 401

The generation unit 401 is configured to generate a detection interface in response to receipt of a living body detection request, the detection interface including a portrait region and a light emission region, and a location of the portrait region and a location of the light emission region randomly changing over time.

In an embodiment, the location of the portrait region and the location of the light emission region may be made to randomly change over time by using various policies. For example:

The generation unit 401 may be specifically configured to randomly generate a portrait region identifier sequence and an emission region identifier sequence in response to receipt of the living body detection request, and generate the detection interface based on the portrait region identifier sequence and the emission region identifier sequence, so that the detection interface includes the portrait region and the light emission region. The location of the portrait region changes based on the portrait region identifier sequence, and the location of the light emission region changes based on the emission region identifier sequence.

In an embodiment, the portrait region identifier sequence and the emission region identifier sequence each may be a sequence including a plurality of coordinates or region identifiers. For example, the portrait region identifier sequence and the emission region identifier sequence each may be a sequence including a plurality of region identifiers. In this case, The generation unit 401 may be specifically configured to generate an initial interface in response to receipt of the living body detection request, the initial interface including a plurality of candidate regions, and each candidate region having a region identifier; randomly generate the portrait region identifier sequence and the emission region identifier sequence based on the region identifier; and select the portrait region from the plurality of candidate regions based on the portrait region identifier sequence, and select the light emission region from the plurality of candidate regions based on the emission region identifier sequence.

In an embodiment, in order to reduce the discomfort caused by the projected light to eyes of a detection object, during the generation of the portrait region identifier sequence and the emission region identifier sequence, the light emission region may be made to be as far away from the portrait region as possible. For example, the light emission region may be set as far as possible at an edge of the detection interface, or the like.

In addition, areas occupied by the portrait region and the light emission region in the detection interface may also be determined according to actual application requirements. For details, refer to the foregoing method embodiment, which is not described herein again.

(2) Projection Unit 402

The projection unit 402 is configured to project light to a detection object through the light emission region, and generate reflected light on a surface of the detection object.

In an embodiment, for ease of better subsequent identification of changes in light (that is, the reflected light) on the surface of the detection object, in addition to being performed based on a location of the reflected light, distinguishing may also be performed based on a color or intensity of the light. That is:

The generation unit 401 may be further configured to randomly generate a light color sequence.

In this embodiment, the projection unit 402 may be specifically configured to project light that changes according to the light color sequence to the detection object through the light emission region, and generate reflected light on the surface of the detection object.

Alternatively, similarly, the generation unit 401 may be further configured to randomly generate a light intensity sequence. In this way, at this time, the projection unit 402 may project light that changes according to the light intensity sequence to the detection object through the light emission region, and generate reflected light on the surface of the detection object, or the like.

For ease of better subsequent identification of changes in light, during generation of a light color sequence, colors with a large color difference (for example, a color difference greater than a preset threshold) may be selected as adjacent colors. Similarly, during generation of a light intensity sequence, a difference between adjacent intensity values in the light intensity sequence may be made to be greater than a specified threshold as much as possible, so that a change in light can be more easily identified. For details, refer to the foregoing method embodiment, which is not described herein again.

(3) Acquisition Unit 403

The acquisition unit 403 is configured to acquire image features formed by the reflected light on the surface of the detection object, and track a sight line of the detection object gazing at the portrait region.

For example, the acquisition unit 403 may include an acquisition subunit, an extraction subunit, and a calculation subunit, as follows:

The acquisition subunit is configured to acquire images obtained during the gazing of the detection object at the portrait region under illumination of the projected light, to obtain a video stream.

For example, the acquisition subunit may be specifically configured to generate prompt information such as voice prompt information, to prompt the detection object to gaze at the portrait region; then, call a camera process, to perform image acquisition on the detection object under the illumination of the projected light through the camera process; and display acquired content in real time in the portrait region, to obtain the video stream.

Camera components corresponding to the camera process include but are not limited to a camera of the terminal, a webcam, a surveillance camera, other devices that can acquire images, and the like.

The extraction subunit is configured to extract, from the video stream, image features formed by the reflected light on the surface of the detection object.

For example, the extraction subunit may specifically crop a target region, such as a face region of the detection object, from the video frame first, and then extract image features from the target region.

The calculation subunit is configured to calculate, based on head information and eye information of the detection object in the video stream, sight line information of the detection object gazing at the portrait region.

For example, the head information includes a head pose sequence. In this case, details may be as follows:

The calculation subunit may be specifically configured to determine a yaw, a pitch, and a roll of a head of the detection object in the video stream to obtain a head pose sequence; detect eye features of the detection object in the video stream to obtain eye information; and detect gaze points of the detection object in the video stream based on the head pose sequence and the eye information by using a preset detection model, to obtain sight line information of the detection object gazing at the portrait region.

The calculation subunit may specifically detect the yaw, the pitch, and the roll of the head of the detection object in the video stream by using a face pose estimation algorithm to obtain the head pose sequence. For details, refer to the foregoing embodiment.

The eye information may be specifically a pupil center sequence. That is, the calculation subunit may be specifically configured to: detect the yaw, the pitch, and the roll of the head of the detection object in the video stream by using a face pose estimation algorithm to obtain the head pose sequence; detect face feature points of the detection object in the video stream by using a face key point detection algorithm; screen the detected face feature points to obtain eye feature points; and detect a pupil center based on the eye feature points by using a pupil center detection algorithm to obtain the pupil center sequence; and detect gaze points of the detection object in the video stream based on the head pose sequence and the pupil center sequence by using a preset detection model, to obtain sight line information of the detection object gazing at the portrait region.

In an embodiment, the head information may further include head coordinate parameters. That is, the calculation subunit may be specifically configured to: detect the yaw, the pitch, and the roll of the head of the detection object in the video stream by using a face pose estimation algorithm to obtain the head pose sequence; obtain three-dimensional coordinates of the head of the detection object in the video stream, to obtain the head coordinate parameters; detect face feature points of the detection object in the video stream by using a face key point detection algorithm; screen the detected face feature points to obtain eye feature points; and detect a pupil center based on the eye feature points by using a pupil center detection algorithm to obtain the pupil center sequence; and detect the gaze points of the detection object in the video stream based on the head pose sequence, the head coordinate parameters, and the eye information by using the preset detection model, to obtain the sight line information of the detection object gazing at the portrait region.

Figure 17:
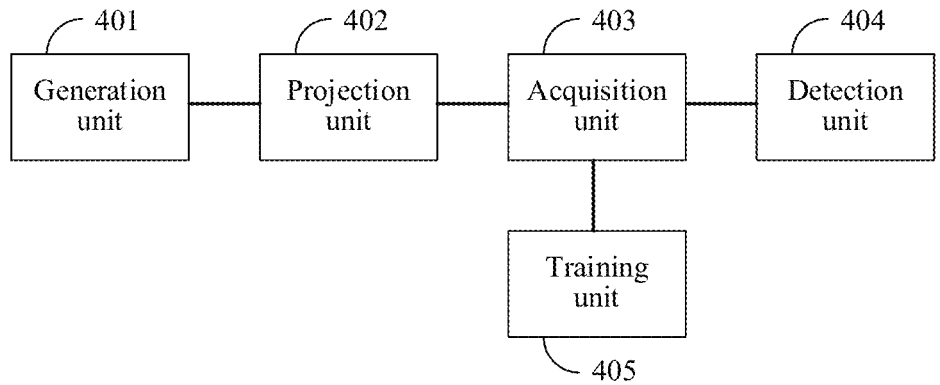
FIG. 17 is another schematic structural diagram of a living body detection apparatus according to an embodiment of this disclosure.

The detection model may be trained by another device and then provided to the living body detection apparatus, or may be trained by the living body detection apparatus. That is, as shown in FIG. 17, the living body detection apparatus may further include a training unit 405, as follows:

The training unit 405 may be configured to: obtain a plurality of head training sample pairs labeled with gaze point true values, the head training sample pair including a head pose sequence sample, an eye information sample, and the like; then, predict gaze points of the detection object in the head training sample pair by using an initial detection model, to obtain gaze point predictive values; and converge the initial detection model based on the gaze point true value and the gaze point predictive value to obtain the detection model.

(4) Detection Unit 404

The detection unit 404 is configured to determine that the detection object is a living body when it is determined, based on the image features, that a change in the reflected light matches a location change of the light emission region and sight line information obtained through tracking matches a location change of the portrait region.

The detection unit 404 may be further configured to determine that the detection object is a non-living body when it is determined, based on the image features, that a change in the reflected light does not match a location change of the light emission region or sight line information obtained through tracking does not match a location change of the portrait region.

It may be determined, based on the image features in various manners, whether the change in the reflected light matches the location change of the light emission region, and it may be determined, in various manners, whether the sight line information obtained through tracking matches the location change of the portrait region. For example, specifically, any one of the following manners may be used:

(1) The detection unit 404 may include a first sequence generation subunit and a first matching subunit, as follows:

The first sequence generation subunit is configured to generate a region change sequence and a light change sequence of the reflected light based on the image features.

For example, the first sequence generation subunit is specifically configured to extract image features of each video frame in the video stream; calculate distribution information of light intensity on the surface of the detection object based on the image features of the video frame; determine, based on the distribution information, that a region in which the light intensity meets a preset condition is a strong light region; generate the region change sequence of the reflected light based on a location change of the strong light region in the video stream; and generate the light change sequence of the reflected light based on a light color change of the strong light region in the video stream.

The first matching subunit is configured to determine that the detection object is a living body when the region change sequence matches the emission region identifier sequence, the light change sequence matches the light color sequence, and the sight line information obtained through tracking matches the portrait region identifier sequence.

(2) The detection unit may include a second sequence generation subunit and a second matching subunit, as follows:

The second sequence generation subunit is configured to generate a region change sequence, a region burst change time point sequence, a light change sequence, and a light burst change time point sequence of the reflected light based on the image features.

For example, the second sequence generation subunit is specifically configured to extract image features of each video frame in the video stream; calculate distribution information of light intensity on the surface of the detection object based on the image features of the video frame; determine, based on the distribution information, that a region in which the light intensity meets a preset condition is a strong light region; generate the region change sequence and the region burst change time point sequence of the reflected light based on a location change of the strong light region in the video stream; and generate the light change sequence and the light burst change time point sequence of the reflected light based on a light color change of the strong light region in the video stream.

The second matching subunit is configured to determine that the detection object is a living body when the region change sequence matches the emission region identifier sequence, the light change sequence matches the light color sequence, the gaze point sequence matches the portrait region identifier sequence, and a difference between every two of the sight line change time point sequence, the region burst change time point sequence, and the light burst change time point sequence is less than a specified value.

(3) The detection unit may include a third sequence generation subunit and a third matching subunit, as follows:

The third sequence generation subunit is configured to generate a region change sequence of the reflected light based on the image features.

The third matching subunit is configured to determine that the detection object is a living body when the region change sequence matches the emission region identifier sequence and sight line information (such as a gaze point sequence) obtained through tracking matches the portrait region identifier sequence.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

It can be learned from the foregoing description that, the generation unit 401 in the living body detection apparatus in this embodiment of this application may generate a detection interface in response to receipt of a living body detection request, the detection interface including a portrait region and a light emission region, and a location of the portrait region and a location of the light emission region randomly changing over time. Subsequently, the projection unit 402 may project light to a detection object through the light emission region, to generate reflected light of the projected light on a surface of the detection object. Then, the acquisition unit 403 acquires image features formed by the reflected light on the surface of the detection object, and tracks a sight line of the detection object gazing at the portrait region. The detection unit 404 determines that the detection object is a living body when it is determined, based on the image features, that a change in the reflected light matches a location change of the light emission region and sight line information obtained through tracking matches a location change of the portrait region; otherwise, the detection object is a non-living body. In this solution, the basis for determining a living body is the reflected light on the surface of the detection object and the sight line information of the detection object, and reflected light and sight line information of a real living body are different from those of a forged living body (a carrier of synthesized pictures or videos, such as a photograph, a mobile phone, or a tablet computer). Therefore, this solution can effectively resist synthetic face attacks. In addition, because the reflected light and the sight line information randomly change (because the portrait region and the light emission region randomly change over time), an illegal intruder cannot attack by injecting pre-imaged videos. Therefore, generally, this solution can effectively resist various living body detection attacks and greatly improve a living body detection effect, thereby improving accuracy and security of identity authentication.

For a specific limitation on the living body detection apparatus, refer to the limitation on the living body detection method above. Details are not described herein again. All or some of the modules (e.g., units, subunits, etc.) in the living body detection apparatus may be implemented through software, hardware, or combinations thereof. The foregoing modules may be built in or independent of a processor of an electronic device in a hardware form, or may be stored in a memory of the electronic device in a software form, so that the processor invokes and performs an operation corresponding to each of the foregoing modules.

Figure 18:
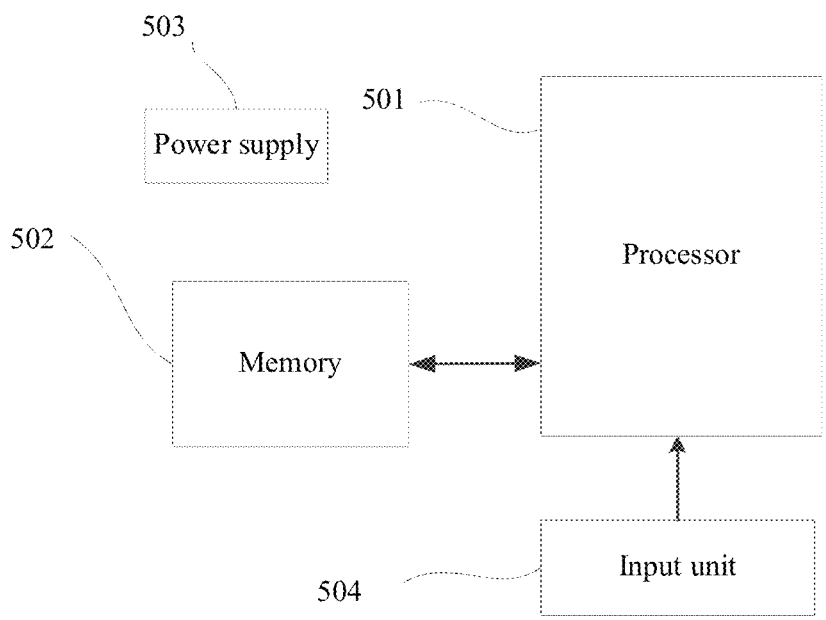
FIG. 18 is a schematic structural diagram of an electronic device according to an embodiment of this disclosure.

Correspondingly, an embodiment of this application further provides an electronic device. Any living body detection apparatus provided in the embodiments of this application is integrated into the electronic device. FIG. 18 is a schematic structural diagram of the electronic device involved in this embodiment of this application. Specifically, the electronic device may include components such as one or more processors 501 with one or more processing cores, a memory 502 with one or more computer-readable storage media, a power supply 503, and an input unit 504. A person skilled in the art may understand that the electronic device structure shown in FIG. 18 does not constitute a limitation to the electronic device. The electronic device may include more or fewer components than those shown in the figure, may combine some components, or may have different component arrangements.

The one or more processors 501 are an example of processing circuitry and a control center of the electronic device, and connect various parts of the entire electronic device by using various interfaces and lines. By running or executing a software program and/or a module stored in the memory 502, and invoking data stored in the memory 502, the processor performs various functions of the electronic device and processes data, thereby performing overall monitoring on the electronic device. In an embodiment, the processor 501 may include one or more processing cores. In an embodiment, the processor 501 may integrate an application processor and a modem processor. The application processor mainly processes an operating system, a user interface, computer readable instructions, and the like. The modem processor mainly processes wireless communication. It may be understood that alternatively, the modem processor may not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, a computer readable instruction required by at least one function (for example, a sound playback function and an image playback function), or the like. The data storage area may store data created according to use of the electronic device. In addition, the memory 502 may include a high-speed random access memory, and may further include a non-volatile memory, such as at least one magnetic disk storage device, a flash memory, or another volatile solid-state storage device. Correspondingly, the memory 502 may further include a memory controller, so that the one or more processors 501 can access the memory 502.

The electronic device further includes the power supply 503 for supplying power to the components. In an embodiment, the power supply 503 may be logically connected to the one or more processors 501 by using a power supply management system, thereby implementing functions, such as charging, discharging, and power consumption management, by using the power supply management system. The power supply 503 may further include one or more of a direct current or alternating current power supply, a recharging system, a power failure detection circuit, a power supply converter or inverter, a power supply state indicator, and any other component.

The electronic device may further include the input unit 504. The input unit 504 may be configured to receive entered numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the one or more processors 501 in the electronic device may load executable files corresponding to processes of one or more computer readable instructions to the memory 502 according to the following instructions, and the processor 501 runs the computer readable instructions stored in the memory 502, to implement various functions as follows:

generating a detection interface in response to receipt of a living body detection request, the detection interface including a portrait region and a light emission region, and a location of the portrait region and a location of the light emission region randomly changing over time; then projecting light to a detection object through the light emission region, and generating reflected light on a surface of the detection object; then acquiring image features formed by the reflected light on the surface of the detection object, and tracking a sight line of the detection object gazing at the portrait region; and determining that the detection object is a living body when it is determined, based on the image features, that a change in the reflected light matches a location change of the light emission region and sight line information obtained through tracking matches a location change of the portrait region.

In an embodiment, for ease of better subsequent identification of changes in light on the surface of the detection object, in addition to being performed based on a location of the reflected light, distinguishing may also be performed based on a color or intensity of the light. That is, one or more processors 501 may further run the computer readable instructions stored in the memory 502, to implement the following functions:

randomly generating a light color sequence or a light intensity sequence in response to receipt of the living body detection request, so that when light is projected to the detection object through the light emission region, the projected light may change based on the light color sequence or the light intensity sequence.

For specific implementation of the foregoing operations, reference may be made to the foregoing embodiments. Details are not described herein again.

It can be learned from the foregoing description that, in this embodiment of this disclosure, in response to receipt of a living body detection request, the electronic device may generate a detection interface, the detection interface including a portrait region and a light emission region, and a location of the portrait region and a location of the light emission region randomly changing over time; subsequently, may project light to a detection object through the light emission region, to generate reflected light of the projected light on a surface of the detection object; then, acquire image features formed by the reflected light on the surface of the detection object, and track a sight line of the detection object gazing at the portrait region; and determine that the detection object is a living body when it is determined, based on the image features, that a change in the reflected light matches a location change of the light emission region and gaze information obtained through tracking matches a location change of the portrait region; otherwise, determine that the detection object is a non-living body. In this solution, the basis for determining a living body is the reflected light on the surface of the detection object and the sight line information of the detection object, and reflected light and sight line information of a real living body are different from those of a forged living body. Therefore, this solution can effectively resist synthetic face attacks. In addition, because the reflected light and the sight line information randomly change, an illegal intruder cannot attack by injecting pre-imaged videos. Therefore, generally, this solution can effectively resist various living body detection attacks and greatly improve a living body detection effect, thereby improving accuracy and security of identity authentication.

A person skilled in the art may understand that all or part of the steps in the various methods of the foregoing embodiments may be completed by using the computer readable instruction or completed by using the computer readable instruction to control related hardware. The computer readable instruction may be stored in a computer readable storage medium, loaded and executed by the one or more processors.

To this end, an embodiment of this disclosure provides one or more computer readable storage media storing computer readable instructions, and the computer readable instructions can be loaded by one or more processors to perform the operations in any one of the living body detection methods according to the embodiments of this disclosure. For example, the computer readable instruction may perform the following steps:

generating a detection interface in response to receipt of a living body detection request, the detection interface including a portrait region and a light emission region, and a location of the portrait region and a location of the light emission region randomly changing over time; then projecting light to a detection object through the light emission region, and generating reflected light on a surface of the detection object; then acquiring image features formed by the reflected light on the surface of the detection object, and tracking a sight line of the detection object gazing at the portrait region; and determining that the detection object is a living body when it is determined, based on the image features, that a change in the reflected light matches a location change of the light emission region and sight line information obtained through tracking matches a location change of the portrait region.

In an embodiment, for ease of better subsequent identification of changes in light on the surface of the detection object, in addition to being performed based on a location of the reflected light, distinguishing may also be performed based on a color or intensity of the light. That is, the computer readable instructions may further be used for performing the following step:

randomly generating a light color sequence or a light intensity sequence in response to receipt of the living body detection request.

In this way, during subsequent projection of light to the detection object through the light emission region, light that changes according to the light color sequence or the light intensity sequence can be projected to the detection object, to generate reflected light, with a corresponding color or corresponding intensity, of the projected light on the surface of the detection object.

For specific implementation of the foregoing operations, reference may be made to the foregoing embodiments. Details are not described herein again.

The storage medium (e.g., non-transitory computer-readable storage medium) may include: a read-only memory (ROM), a random access memory (RAM), a magnetic disk, an optical disc, or the like.

Because the instructions stored in the storage medium may perform the steps of any living body detection method provided in the embodiments of this disclosure, the instructions can implement beneficial effects that may be implemented by any living body detection method provided in the embodiments of this disclosure. For details, reference may be made to the foregoing embodiments. Details are not described herein again.

The living body detection method and apparatus, the electronic device and the storage medium provided in the embodiments of this disclosure are described in detail above. The principle and implementations of this disclosure are described herein by using specific examples. The descriptions of the foregoing embodiments are merely used for helping understand the method and core ideas of this disclosure. Meanwhile, a person of ordinary skill in the art may make modifications to the specific implementations and application scopes according to the ideas of this disclosure. In conclusion, the content of the specification should not be construed as a limitation to this disclosure.

What is claimed is:

1. A method of living body detection, comprising:
generating, by processing circuitry of an electronic device, a detection interface in response to a receipt of a living body detection request for a verification of a detection object, the detection interface comprising:
a first region with a viewing target for the detection object to track, a position of the first region in the detection interface changing during a detection time according to a first region position sequence of a position change of the first region, and
a second region configured to output light, a position of the second region in the detection interface changing during the detection time according to a second region position sequence of a position change of the second region;
randomly generating a light color sequence of the second region;
outputting the light from the second region according to the light color sequence;
receiving a video stream that is captured during the detection time;
determining a sight line sequence of a sight line change of the detection object based on the video stream;
determining a sight line change time point sequence based on time information associated with the sight line sequence of the sight line change of the detection object;
generating a region change sequence, a region burst change time point sequence, a light change sequence, and a light burst change time sequence of reflected light based on the video stream; and
determining that the detection object is a living body at least based on (i) whether the sight line sequence of the sight line change of the detection object matches the first region position sequence of the position change of the first region, (ii) whether the light change sequence matches the light color sequence, (iii) whether the region change sequence matches the second region position sequence of the position change of the second region, and (iv) time differences between the sight line change time point sequence, the region burst change time point sequence, and light burst change time point sequence being less than a specified value.

2. The method according to claim 1, wherein the determining the sight line sequence of the sight line change of the detection object comprises:
determining, based on head information and eye information of the detection object in the video stream, the sight line sequence of the sight line change of the detection object.

3. The method according to claim 2, wherein the determining the sight line sequence comprises:
determining a head pose sequence based on a yaw, a pitch, and a roll of a head of the detection object in the video stream;
determining a pupil center sequence based on face feature points detection from the video stream; and
determining the sight line sequence based on the head pose sequence and the pupil center sequence.

4. The method according to claim 3, wherein the determining the sight line sequence comprises:
determining three-dimensional coordinates of the head of the detection object in the video stream; and
determining the sight line sequence based on the three-dimensional coordinates of the head, the head pose sequence and the pupil center sequence.

5. The method according to claim 1, wherein the generating the detection interface comprises:
generating a voice prompt for instructing the detection object to track the first region; and displaying a captured image of the detection object in the first region.

6. The method according to claim 1, wherein the generating the detection interface comprises:
  randomly generating the first region position sequence of the position change of the first region and the second region position sequence of the position change of the second region in response to the receipt of the living body detection request; and
  generating the detection interface with the position of the first region changing based on the first region position sequence and the position of the second region changing based on the second region position sequence.

7. The method according to claim 1, wherein the generating the region change sequence and the light change sequence comprises:
  determining light intensity distribution on a surface of the detection object respectively for frames in the video stream;
  determining respective strong light surface regions of the detection object in the frames that meet a light intensity condition based on the light intensity distribution;
  generating the region change sequence of the reflected light based on a location change of the strong light surface regions of the detection object in the video stream; and
  generating the light change sequence of the reflected light based on a light color change of the strong light surface regions in the video stream.

8. The method according to claim 1, wherein the generating the region change sequence, the region burst change time point sequence, the light change sequence, and the light burst change time point sequence of the reflected light based on the video stream comprises:
  determining light intensity distribution on a surface of the detection object respectively for frames in the video stream;
  determining, based on the light intensity distribution, respectively strong light surface regions of the detection object of the frames in the video stream;
  generating the region change sequence and the region burst change time point sequence of the reflected light based on a location change of the strong light surface regions in the video stream; and
  generating the light change sequence and the light burst change time point sequence of the reflected light based on a light color change of the strong light surface regions in the video stream.

9. The method according to claim 1, wherein the second region is determined in the interface region with a maximum possible distance to the first region.

10. An apparatus, comprising processing circuitry configured to:
  generate a detection interface in response to a receipt of a living body detection request for a verification of a detection object, the detection interface comprising:
    a first region with a viewing target for the detection object to track, a position of the first region in the detection interface changing during a detection time according to a first region position sequence of a position change of the first region, and
    a second region configured to output light, a position of the second region in the detection interface changing during the detection time according to a second region position sequence of a position change of the second region;
  randomly generate a light color sequence of the second region;
  output the light from the second region according to the light color sequence;
  receive a video stream that is captured during the detection time;
  determine a sight line sequence of a sight line change of the detection object based on the video stream;
  determine a sight line change time point sequence based on time information associated with the sight line sequence of the sight line change of the detection object;
  generate a region change sequence, a region burst change time point sequence, a light change sequence, and a light burst change time sequence of reflected light based on the video stream; and
  determine that the detection object is a living body at least based on (i) whether the sight line sequence of the sight line change of the detection object matches the first region position sequence of the position change of the first region, (ii) whether the light change sequence matches the light color sequence, (iii) whether the region change sequence matches the second region position sequence of the position change of the second region, and (iv) time differences between of the sight line change time point sequence, the region burst change time point sequence, and light burst change time point sequence being less than a specified value.

11. The apparatus according to claim 10, wherein the processing circuitry is configured to:
  determine, based on head information and eye information of the detection object in the video stream, the sight line sequence of the sight line change of the detection object.

12. The apparatus according to claim 11, wherein the processing circuitry is configured to:
  determine a head pose sequence based on a yaw, a pitch, and a roll of a head of the detection object in the video stream;
  determine a pupil center sequence based on face feature points detection from the video stream; and
  determine the sight line sequence based on the head pose sequence and the pupil center sequence.

13. The apparatus according to claim 12, wherein the processing circuitry is configured to:
  determine three-dimensional coordinates of the head of the detection object in the video stream; and
  determine the sight line sequence based on the three-dimensional coordinates of the head, the head pose sequence and the pupil center sequence.

14. The apparatus according to claim 10, wherein the processing circuitry is configured to:
  generate voice prompt for instructing the detection object to track the first region; and
  display a captured image of the detection object in the first region.

15. A non-transitory computer-readable medium storing instructions which when executed by a computer cause the computer to perform:
  generating a detection interface in response to a receipt of a living body detection request for a verification of a detection object, the detection interface comprising:
    a first region with a viewing target for the detection object to track, a position of the first region in the detection interface changing during a detection time according to a first region position sequence of a position change of the first region, and a second region configured to output light, a position of the second region in the detection interface changing during the detection time according to a second region position sequence of a position change of the second region;

randomly generating a light color sequence of the second region;

outputting the light from the second region according to the light color sequence;

receiving a video stream that is captured during the detection time;

determining a sight line sequence of a sight line change of the detection object based on the video stream;

determining a sight line change time point sequence based on time information associated with the sight line sequence of the sight line change of the detection object;

generating a region change sequence, a region burst change time point sequence, a light change sequence, and a light burst change time sequence of reflected light based on the video stream; and determining that the detection object is a living body at least based on (i) whether the sight line sequence of the sight line change of the detection object matches the first region position sequence of the position change of the first region, (ii) whether the light change sequence matches the light color sequence, (iii) whether the region change sequence matches the second region position sequence of the position change of the second region, and (iv) time differences between the sight line change time point sequence, the region burst change time point sequence, and light burst change time point sequence being less than a specified value.

* * * * *